US012375848B2

(12) United States Patent
Sugata

(10) Patent No.: US 12,375,848 B2
(45) Date of Patent: Jul. 29, 2025

(54) ELECTROACOUSTIC TRANSDUCER AND ELECTROACOUSTIC TRANSDUCER UNIT

(71) Applicant: FOSTER ELECTRIC COMPANY, LIMITED, Tokyo (JP)

(72) Inventor: Hiroshi Sugata, Tokyo (JP)

(73) Assignee: FOSTER ELECTRIC COMPANY, LIMITED, Tokyo (JP)

( * ) Notice: Subject to any disclaimer, the term of this patent is extended or adjusted under 35 U.S.C. 154(b) by 125 days.

(21) Appl. No.: 18/285,754

(22) PCT Filed: Mar. 25, 2022

(86) PCT No.: PCT/JP2022/014680

§ 371 (c)(1),
(2) Date: Oct. 5, 2023

(87) PCT Pub. No.: WO2022/215558

PCT Pub. Date: Oct. 13, 2022

(65) Prior Publication Data

US 2024/0373160 A1 Nov. 7, 2024

(30) Foreign Application Priority Data

Apr. 7, 2021 (JP) ................................. 2021-065225

(51) Int. Cl.
*H04R 9/06* (2006.01)
*H04R 1/02* (2006.01)
(Continued)

(52) U.S. Cl.
CPC ............. *H04R 1/345* (2013.01); *H04R 1/025* (2013.01); *H04R 1/24* (2013.01); *H04R 1/2811* (2013.01);
(Continued)

(58) Field of Classification Search
CPC ........ H04R 1/025; H04R 1/24; H04R 1/2803; H04R 1/2811; H04R 1/2826;
(Continued)

(56) References Cited

U.S. PATENT DOCUMENTS 4,490,815 A 12/1984 Umehara et al.
6,618,487 B1 * 9/2003 Azima .................... H04R 5/02 381/396

(Continued)

FOREIGN PATENT DOCUMENTS

JP S61-45745 Y2 12/1986
JP H10-93672 A 4/1998

(Continued)

OTHER PUBLICATIONS

International Search Report and Written Opinion for Application No. PCT/JP2022/014680, dated Jun. 14, 2022.

*Primary Examiner* — Huyen D Le
(74) *Attorney, Agent, or Firm* — MARSHALL, GERSTEIN & BORUN LLP

(57) ABSTRACT

An electroacoustic transducer includes a port that guides a component of at least a partial frequency band of a sound radiated from a first diaphragm in a direction opposite to a direction in which a front surface 38A of a second diaphragm faces, to an external space on a front surface side of the second diaphragm. As the port is provided, the electroacoustic transducer is configured such that a sound pressure of a synthesized sound in the vicinity of a crossover frequency of radiated sounds from the first diaphragm and the second diaphragm in a case in which a drive unit generates vibration is equal to or higher than a sound pressure of the radiated sound from only one of the first diaphragm and the second diaphragm at the crossover frequency.

6 Claims, 18 Drawing Sheets

(51) Int. Cl.

| | |
|---|---|
| ***H04R 1/24*** | (2006.01) |
| ***H04R 1/28*** | (2006.01) |
| ***H04R 1/34*** | (2006.01) |
| ***H04R 7/04*** | (2006.01) |
| ***H04R 7/18*** | (2006.01) |

(52) U.S. Cl.
CPC ............... *H04R 7/04* (2013.01); *H04R 7/045* (2013.01); *H04R 7/18* (2013.01); *H04R 9/06* (2013.01); *H04R 2201/021* (2013.01)

(58) Field of Classification Search
CPC .... H04R 1/2853; H04R 1/2861; H04R 1/345; H04R 7/04; H04R 7/045; H04R 7/16; H04R 7/18; H04R 9/02; H04R 9/043; H04R 9/06; H04R 9/066; H04R 11/02; H04R 2201/021; H04R 2440/05
See application file for complete search history.

(56) References Cited

U.S. PATENT DOCUMENTS

| | | | | |
|---|---|---|---|---|
| 2005/0057101 | A1 | 3/2005 | Nakagawa et al. | |
| 2005/0276434 | A1 | 12/2005 | Kobayashi et al. | |
| 2008/0197719 | A1 | 8/2008 | Nakagawa et al. | |
| 2011/0255718 | A1 | 10/2011 | Fukushima et al. | |
| 2018/0054679 | A1 | 2/2018 | Kono | |
| 2023/0388701 | A1* | 11/2023 | Struzik .................. | H04R 1/025 |
| 2024/0406616 | A1* | 12/2024 | Wang ..................... | H04R 9/025 |

FOREIGN PATENT DOCUMENTS

| | | | |
|---|---|---|---|
| JP | H10-285689 | A | 10/1998 |
| JP | 2-936009 | B2 | 8/1999 |
| JP | 2003-235232 | A | 8/2003 |
| JP | 2005-354297 | A | 12/2005 |
| JP | 3-749662 | B2 | 3/2006 |
| JP | 2010-157885 | A | 7/2010 |
| JP | 6-325957 | B2 | 5/2018 |

* cited by examiner

ELECTROACOUSTIC TRANSDUCER AND ELECTROACOUSTIC TRANSDUCER UNIT

TECHNICAL FIELD

The present disclosure relates to an electroacoustic transducer and an electroacoustic transducer unit.

BACKGROUND ART

Japanese Patent No. 6325957 discloses an exciter. The exciter includes: a vibration body including a yoke and a magnet; a frame that houses the vibration body and supports the vibration body in a vibratable manner via a damper; a voice coil bobbin that is installed inside the frame and has one end attached to the frame and the other end extending to the vicinity of the vibration body; and a voice coil provided at the other end of the voice coil bobbin. Then, in the exciter, the vibration body vibrates according to an acoustic signal flowing through the voice coil, and vibration of the vibrator is transferred to the frame via the damper, so that it is possible to output a low-frequency sound via a transfer medium on which the frame is installed.

In the exciter, an opening is formed in the frame, and an outer peripheral surface of the one end of the voice coil bobbin is attached to a peripheral edge portion of the opening of the frame. A vibration member is provided in such a way as to cover an open portion of the one end of the voice coil bobbin. As a result, vibration of the voice coil is transferred to the vibration member via the voice coil bobbin, so that a high-frequency sound can be output from the vibration member toward the outside of the frame.

As described above, a vibration function for outputting a low-frequency sound and a function of outputting a high-frequency sound can be implemented by one driver in the related art described above, and thus, size reduction can be achieved compared to a multi-way speaker system.

SUMMARY OF INVENTION

Technical Problem

However, in the related art described above, in an intermediate frequency band between a low-frequency sound and a high-frequency sound, the phase of sound from the transfer medium and the phase of sound from the vibration member are opposite to each other, and thus, a band in which a sound pressure greatly decreases (dip) occurs.

The present disclosure provides an electroacoustic transducer and an electroacoustic transducer unit capable of reproducing a high-quality sound by reducing a decrease in sound pressure in an intermediate frequency band between a low-frequency sound and a high-frequency sound while achieving size reduction.

Solution to Problem

A first aspect of the present disclosure is an electroacoustic transducer including: a drive unit that generates vibration, the drive unit being configured to, in response to an electric input signal, cause an action portion to generate an action force with respect to a reaction portion and cause the reaction portion to apply a reaction force to the action portion; a first diaphragm connected to one having a smaller mass out of the action portion and the reaction portion; and a second diaphragm having a larger area than the first diaphragm, the second diaphragm being connected to the first diaphragm via at least a first suspension, and being connected to one having a larger mass out of the action portion and the reaction portion via at least a second suspension, the second diaphragm being configured to radiate a sound to an external space on a front surface side when the drive portion generates vibration, wherein by providing a port that guides a component of at least a partial frequency band of a sound radiated from the first diaphragm in a direction opposite to a direction in which a front surface of the second diaphragm faces, to the external space on the front surface side of the second diaphragm, the electroacoustic transducer is configured such that a sound pressure of a synthesized sound in a vicinity of a crossover frequency of radiated sounds from the first diaphragm and the second diaphragm in when the drive unit generates vibration becomes equal to or higher than a sound pressure of the radiated sound from only one of the first diaphragm and the second diaphragm at the crossover frequency The "crossover frequency" in the first aspect refers to a frequency at which the radiated sound from the first diaphragm and the radiated sound from the second diaphragm are radiated at the same sound pressure (the same applies to the "crossover frequency" in the following specification).

According to the above configuration, the drive unit is configured to cause the action portion to generate the action force for the reaction portion in response to the electric input signal and cause the reaction portion to apply the reaction force to the action portion to generate vibration. The first diaphragm is connected to one having a smaller mass between the action portion and the reaction portion. Therefore, when the one having a smaller mass between the action portion and the reaction portion vibrates, the first diaphragm integrally vibrates. The first diaphragm has a smaller area than the second diaphragm, and a high-frequency sound can be reproduced from the first diaphragm.

The second diaphragm connected to the first diaphragm via at least the first suspension is connected to one having a larger mass between the action portion and the reaction portion via at least the second suspension. The second diaphragm has a larger area than the first diaphragm, and can radiate a sound to the external space on the front surface side, in a case in which the drive unit generates vibration. Here, in a case in which the drive unit generates vibration, vibration of the first diaphragm that integrally vibrates with one having a smaller mass between the action portion and the reaction portion is input to the second diaphragm via at least the first suspension, and a force acting from one having a smaller mass between the action portion and the reaction portion to one having a larger mass between the action portion and the reaction portion is input to the second diaphragm via at least the second suspension. As a result, in a case in which the drive unit generates vibration, vibration in a low-frequency band is input to the second diaphragm. Therefore, generation of a resonance sound that is likely to occur in a high-frequency band may be suppressed, and a low-frequency sound may be reproduced on the front surface side of the second diaphragm.

As described above, in the electroacoustic transducer of the present disclosure, since it is possible to vibrate two diaphragms, that is, the first diaphragm and the second diaphragm, with one drive unit, size reduction can be achieved. Moreover, as the port that guides the component of at least a partial frequency band of the sound radiated from the first diaphragm in the direction opposite to the direction in which the front surface of the second diaphragm faces, to the external space on the front surface side of the second diaphragm is provided, the electroacoustic transducer of the present disclosure is configured such that the sound pressure of the synthesized sound in the vicinity of the crossover frequency of the radiated sounds from the first diaphragm and the second diaphragm, in a case in which the drive unit generates vibration is equal to or higher than the sound pressure of the radiated sound from only one of the first diaphragm and the second diaphragm at the crossover frequency. As a result, it is possible to reproduce a high-quality sound by suppressing a decrease in sound pressure in an intermediate frequency band between a low-frequency sound and a high-frequency sound.

In a second aspect of the present disclosure, in the electroacoustic transducer according to the first aspect, a direction of a front surface of the first diaphragm may be matched with a direction of the front surface of the second diaphragm, and a sound may be radiated from the front surface of the first diaphragm to the external space on the front surface side of the second diaphragm, and the port may be configured to guide a component of a partial frequency band of sound radiated from a rear surface of the first diaphragm into a cavity on a rear surface side of the first diaphragm, to the external space on the front surface side of the second diaphragm.

According to the above configuration, the direction of the front surface of the first diaphragm is matched with the direction of the front surface of the second diaphragm, so that a sound can be radiated from the front surface of the first diaphragm to the external space on the front surface side of the second diaphragm. Meanwhile, the port guides a component of a partial frequency band of a sound radiated from the rear surface of the first diaphragm into the cavity on the rear surface side of the first diaphragm, to the external space on the front surface side of the second diaphragm. As a result, a sound from the rear surface of the first diaphragm is added to a frequency band of a dip in the sound pressure frequency characteristic, in a case in which a sound from the front surface of the first diaphragm and a sound from the front surface of the second diaphragm are synthesized, and a decrease in sound pressure in an intermediate frequency band between a low-frequency sound and a high-frequency sound is suppressed as compared with the related technology (the above-described related art).

In a third aspect of the present disclosure, in the electroacoustic transducer according to the first aspect, a direction of a front surface of the first diaphragm may be opposite to a direction of the front surface of the second diaphragm, and a sound from a rear surface of the first diaphragm may not be radiated to the external space on the front surface side of the second diaphragm, and the port may be configured to guide a component of at least a partial frequency band of a sound radiated from the front surface of the first diaphragm in the direction opposite to the direction in which the front surface of the second diaphragm faces, to the external space on the front surface side of the second diaphragm.

According to the above configuration, the direction of the front surface of the first diaphragm is set to be opposite to the direction of the front surface of the second diaphragm. A sound from the rear surface of the first diaphragm is not radiated to the external space on the front surface side of the second diaphragm. The port guides a component of at least a partial frequency band of a sound radiated from the front surface of the first diaphragm in the direction opposite to the direction in which the front surface of the second diaphragm faces, to the external space on the front surface side of the second diaphragm. As a result, a sound from the electroacoustic transducer is a synthesized sound of a sound from the front surface of the second diaphragm, and at least a part of a sound from the front surface of the first diaphragm that faces a side opposite to a side that the front surface of the second diaphragm faces. Here, according to the above configuration, in an intermediate frequency band between a low-frequency sound and a high-frequency sound, the phase of a sound from the front surface of the second diaphragm and the phase of a sound from the front surface of the first diaphragm are not opposite to each other, as a result of which a decrease in sound pressure in the intermediate frequency band between the low-frequency sound and the high-frequency sound is suppressed as compared with a related technology (the above-described related art).

In a fourth aspect of the present disclosure, in the electroacoustic transducer according to the second aspect, a communication portion may be formed, that allows two spaces in the cavity on the rear surface side of the first diaphragm partitioned by the second suspension to communicate with each other.

According to the above configuration, a resonance frequency of a sound from the rear surface of the first diaphragm can be adjusted by effectively using not only air in one space that is in contact with the rear surface of the first diaphragm but also air in the other space of the two spaces and partitioned by the second suspension in the cavity on the rear surface side of the first diaphragm.

In a fifth aspect of the present disclosure, in the electroacoustic transducer according to the second or fourth aspect, a hole may be formed to penetrate through the second diaphragm, and the first diaphragm and an outlet of the port may be disposed inside the hole when viewed from a front surface side of the second diaphragm, and components including the drive unit, the first diaphragm, the first suspension, the second suspension, and the port may be unitized and disposed in such as not to protrude from the front surface side of the second diaphragm.

According to the above configuration, a sound from the front surface of the first diaphragm and a sound from the outlet of the port are output from the hole of the second diaphragm. In addition, since the components including the drive unit, the first diaphragm, the first suspension, the second suspension, and the port are unitized, the electroacoustic transducer can be easily manufactured by attaching the unitized components in such a way as to be continuous with the hole of the second diaphragm. Further, since the unitized components do not protrude from the front surface side of the second diaphragm, a simple form can be implemented.

A sixth aspect of the present disclosure is an electroacoustic transducer unit including: a housing that includes an attachment portion; a drive unit housed in the housing and generates vibration, the drive unit being configured to, in response to an electric input signal, cause an action portion to generate an action force with respect to a reaction portion and cause the reaction portion to apply a reaction force to the action portion; a first diaphragm provided inside the housing, the first diaphragm connected to one having a smaller mass out of the action portion and the reaction portion; a first suspension provided inside the housing, the first suspension connects the first diaphragm and the housing; and a second suspension provided inside the housing, the second suspension connects the housing and one having a larger mass out of the action portion and the reaction portion, wherein the electroacoustic transducer unit is used in an electroacoustic transducer in which a second diaphragm is configured to radiate a sound to an external space on a front surface side of the second diaphragm when the drive unit generates vibration in an attached state, in which the attachment portion of the housing is attached to the second diaphragm having a larger area than the first diaphragm, and wherein a port that can guide a component of at least a partial frequency band of a sound radiated from the first diaphragm in a direction opposite to a direction in which a front surface of the second diaphragm faces when the drive unit generates vibration in the attached state, to the external space on the front surface side of the second diaphragm is provided, and by providing the port, the electroacoustic transducer unit is configured such that a sound pressure of a synthesized sound in a vicinity of a crossover frequency of radiated sounds from the first diaphragm and the second diaphragm when the drive unit generates vibration in the attached state becomes equal to or higher than a sound pressure of the radiated sound from only one of the first diaphragm and the second diaphragm at the crossover frequency.

According to the above configuration, the drive unit housed in the housing is configured to cause the action portion to generate the action force for the reaction portion in response to the electric input signal and cause the reaction portion to apply the reaction force to the action portion to generate vibration. The first diaphragm provided inside the housing is connected to one having a smaller mass between the action portion and the reaction portion. Therefore, when the one having a smaller mass between the action portion and the reaction portion vibrates, the first diaphragm integrally vibrates. Further, inside the housing, the first suspension connects the first diaphragm and the housing, and the second suspension connects the housing and one having a larger mass between the action portion and the reaction portion. Further, the electroacoustic transducer unit of the present disclosure is used in the electroacoustic transducer in which the second diaphragm can radiate a sound to the external space on the front surface side of the second diaphragm in a case in which the drive unit generates vibration in the attached state in which the attachment portion of the housing is attached to the second diaphragm having a larger area than the first diaphragm. As described above, the electroacoustic transducer unit of the present disclosure can vibrate two diaphragms, that is, the first diaphragm and the second diaphragm.

Further, in the electroacoustic transducer unit of the present disclosure, the port can guide a component in at least a partial frequency band of a sound radiated from the first diaphragm in the direction opposite to the direction in which the front surface of the second diaphragm faces in a case in which the drive unit generates vibration in the attached state in which the attachment portion of the housing is attached to the second diaphragm, to the external space on the front surface side of the second diaphragm. As the port is provided, the electroacoustic transducer unit is configured such that the sound pressure of the synthesized sound in the vicinity of the crossover frequency of the radiated sounds from the first diaphragm and the second diaphragm, in a case in which the drive unit generates vibration in the attached state is equal to or higher than the sound pressure of the radiated sound from only one of the first diaphragm and the second diaphragm at the crossover frequency. As a result, it is possible to reproduce a high-quality sound by suppressing a decrease in sound pressure in an intermediate frequency band between a low-frequency sound and a high-frequency sound.

Advantageous Effects of Invention

According to the above aspect, the electroacoustic transducer and the electroacoustic transducer of an embodiment of the present disclosure may reproduce a high-quality sound by reducing a decrease in sound pressure in an intermediate frequency band between a low-frequency sound and a high-frequency sound while achieving size reduction.

DESCRIPTION OF EMBODIMENTS

First Exemplary Embodiment

Figure 1:
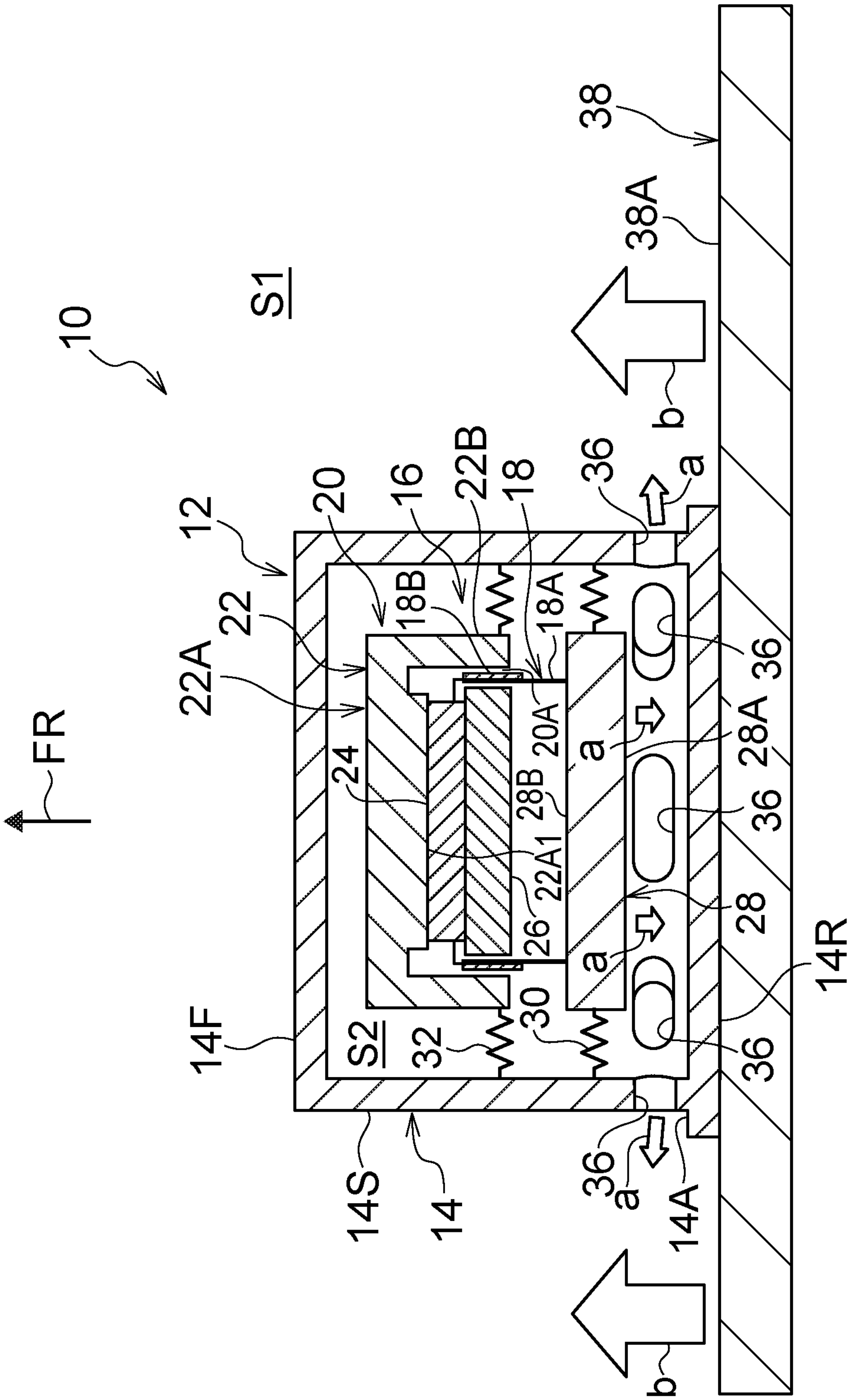
FIG. 1 is a schematic cross-sectional view illustrating an electroacoustic transducer including an electroacoustic transducer unit according to a first exemplary embodiment of the present disclosure.

An electroacoustic transducer including an electroacoustic transducer unit according to a first exemplary embodiment of the present disclosure will be described with reference to FIGS. 1 to 4B. FIG. 1 is a schematic cross-sectional view of an electroacoustic transducer 10 including an electroacoustic transducer unit (also referred to as a "driver") 12 according to the first exemplary embodiment. Note that, an arrow FR illustrated in FIG. 1 indicates a forward direction (a listening position side) in which the electroacoustic transducer 10 radiates a sound. Hereinafter, in a case in which a description is simply made using a front-back direction, unless otherwise specified, the front-back direction indicates a front-back direction based on the electroacoustic transducer 10. Furthermore, in the following, in a case in which the electroacoustic transducer unit 12 is described using a front-rear direction, the front-rear direction indicates a front-rear direction in a state where the electroacoustic transducer unit 12 is installed as a part of the electroacoustic transducer 10.

As illustrated in FIG. 1, the electroacoustic transducer unit 12 includes a housing 14. The housing 14 includes a front wall portion 14F disposed on a front side, a rear wall portion 14R disposed on a rear side opposite to the front wall portion 14F, and a cylindrical peripheral wall portion 14S connecting an outer peripheral end portion of the front wall portion 14F and an outer peripheral end portion of the rear wall portion 14R. An attachment portion 14A for attachment to another member is provided on the housing 14. As an example, the attachment portion 14A projects in a flange shape in such a way as to be orthogonal to the front-rear direction from a portion where the rear wall portion 14R and the peripheral wall portion 14S intersect.

A drive unit 16 is housed in the housing 14. Attachment of the drive unit 16 to the housing 14 will be described later. The drive unit 16 includes a magnetic circuit unit 20 as an action portion and a voice coil unit 18 as a reaction portion. In the present exemplary embodiment, the magnetic circuit unit 20 has a larger mass than the voice coil unit 18.

The voice coil unit 18 includes a voice coil bobbin 18A formed by bending a film in a cylindrical shape, and a voice coil main body 18B wound around a front portion of an outer peripheral surface of the voice coil bobbin 18A. In the drawing, a cross section of the voice coil bobbin 18A is indicated by a bold line for convenience, and a cross section of the voice coil main body 18B is illustrated in a simplified manner. Examples of a material of the voice coil bobbin 18A can include a resin material such as polyimide (PI) and a paper material such as kraft paper, and can further include a metal material such as an aluminum alloy. The voice coil main body 18B is made of an enameled wire obtained by coating an electric wire (for example, a copper wire) which is a linear conductor with an enameled film, and is wound around the voice coil bobbin 18A in two layers as an example.

The magnetic circuit unit 20 includes a yoke 22, a magnet 24, and a plate 26. The magnetic circuit unit 20 of the exemplary embodiment is an internal magnetic circuit unit that can achieve size reduction of the drive unit 16. The yoke 22 is a ferromagnetic body and is formed in a bottomed cylindrical shape, and includes a bottom portion 22A and a cylindrical portion 22B. The yoke 22 is disposed in such a way that a central axis direction thereof is along the front-rear direction (the direction of the arrow FR and an opposite direction thereof) and the bottom portion 22A is on the front side. A pedestal portion 22A1 is formed on the bottom portion 22A of the yoke 22 at a portion except for an outer peripheral portion on a rear surface side of the bottom portion 22A. The magnet 24 is formed in a disk shape and is fixed to a rear surface side of the pedestal portion 22A1 of the yoke 22. The magnet 24 is formed to have a smaller diameter than the pedestal portion 22A1 of the yoke 22. The plate 26 is a ferromagnetic body, is formed in a disk shape, and is fixed to a rear surface side of the magnet 24. The plate 26 is formed to have a larger diameter than the pedestal portion 22A1 of the yoke 22 and the magnet 24.

A magnetic gap 20A is formed between a rear portion of an inner peripheral surface of the cylindrical portion 22B of the yoke 22 and an outer peripheral surface of the plate 26. The voice coil main body 18B is inserted into the magnetic gap 20A together with the voice coil bobbin 18A. Then, the magnetic circuit unit 20 vibrates the voice coil unit 18 in the front-rear direction by using a Lorentz force based on an electric input signal to the voice coil main body 18B. That is, the drive unit 16 is configured to cause the magnetic circuit unit 20 to generate an action force for the voice coil unit 18 in response to an electric input signal, and cause the voice coil unit 18 to apply a reaction force to the magnetic circuit unit 20, thereby generating vibration. A dimension of the voice coil unit 18 in the front-rear direction applied to the electroacoustic transducer 10 of the exemplary embodiment is set to be large in consideration of vibration of the magnetic circuit unit 20 in the front-rear direction.

A first diaphragm 28 is connected to a rear end of the voice coil bobbin 18A of the voice coil unit 18. The first diaphragm 28 is provided inside the housing 14, and a cavity S2 is formed on a rear surface 28B side of the first diaphragm 28. A front surface 28A of the first diaphragm 28 is opposite to the side of the first diaphragm 28 that is adjacent to the voice coil bobbin 18A (in other words, a side facing the rear wall portion 14R of the housing 14). The direction of the front surface 28A of the first diaphragm 28 is set to be opposite to the front side (see the direction of the arrow FR) of the electroacoustic transducer 10. In the drawing, for convenience, the first diaphragm 28 is schematically illustrated in a simplified manner. In the drawing, a direction in which a sound from the first diaphragm 28 propagates is simplified and indicated by a white arrow a.

As an example, a paper cone (a cone made of a material containing pulp fibers or the like) can be applied as the first diaphragm 28. As a material of the first diaphragm 28, for example, a papermaking material such as pulp fibers or a resin material such as polypropylene (PP), polyimide (PI), polyetherimide (PEI), or polycarbonate (PC) can be applied, and a metal material such as an aluminum alloy can also be applied. Further, a film-like diaphragm (a diaphragm having a small thickness) can be applied as the first diaphragm 28.

The first diaphragm 28 and the housing 14 are connected by a first suspension 30. The first suspension 30 is provided inside the housing 14 and formed in an annular shape in front view, and is joined to an outer peripheral portion of the first diaphragm 28 and a portion on an inner surface side of the housing 14. The first suspension 30 is an element that can be grasped as a mechanical filter having a function of passing low-frequency vibration and blocking high-frequency vibration.

Figure 16:
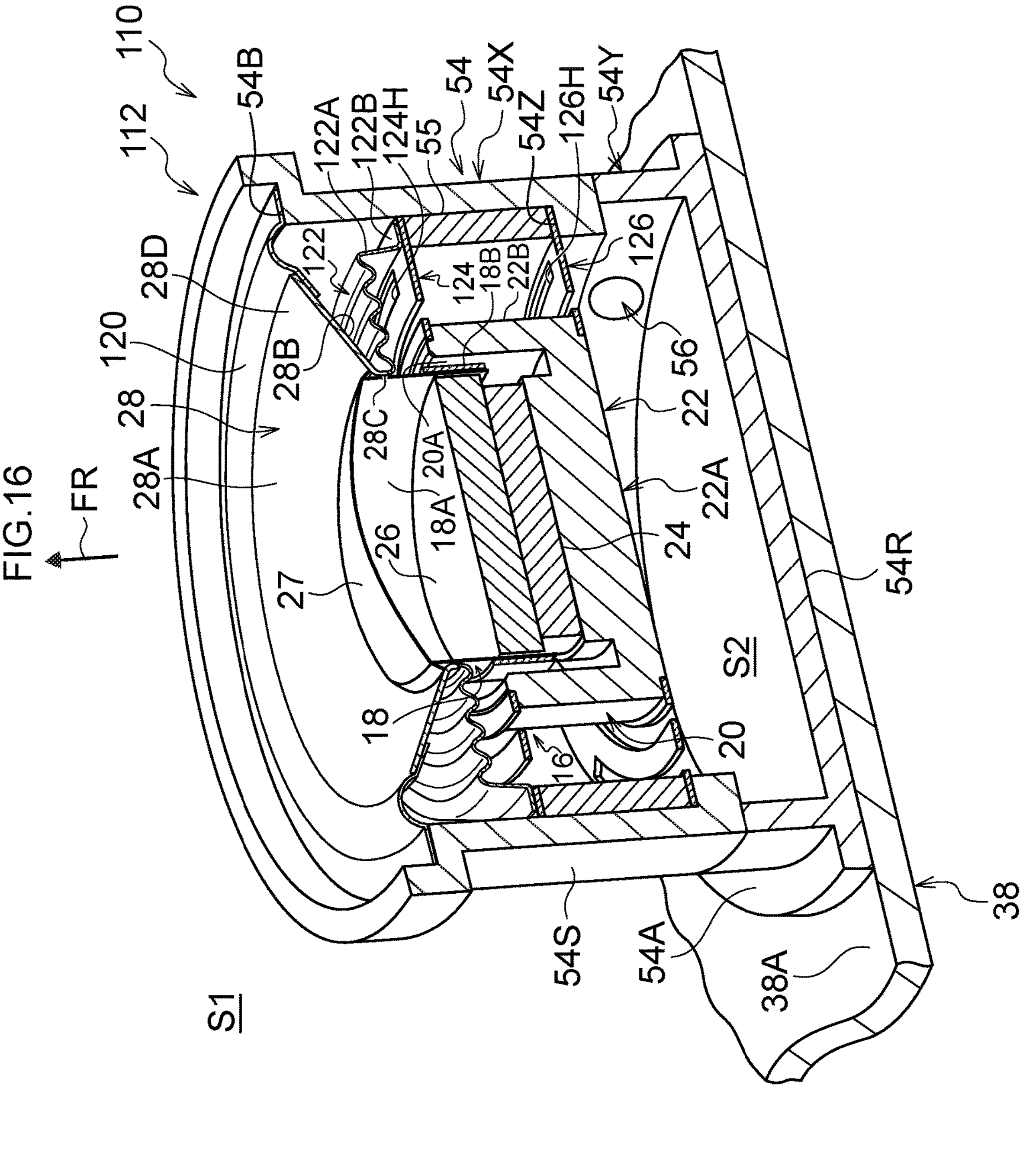
FIG. 16 is a partially cut-away perspective view illustrating an electroacoustic transducer including an electroacoustic transducer unit according to a ninth exemplary embodiment of the present disclosure.

Examples of a member corresponding to the first suspension 30 include a known edge. A material and a shape of the edge are a material and a shape that can acoustically block a space in front of and behind the first diaphragm 28. See FIG. 16 for a detailed description. FIG. 16 of a ninth exemplary embodiment described later illustrates a part of a first suspension 120 implemented by an edge. The electroacoustic transducer unit 12 is configured such that a sound from the rear surface 28B of the first diaphragm 28 is not radiated to a space outside the housing 14 (an external space S1 on a front surface 38A side of a second diaphragm 38 to be described in detail later).

Figure 7:
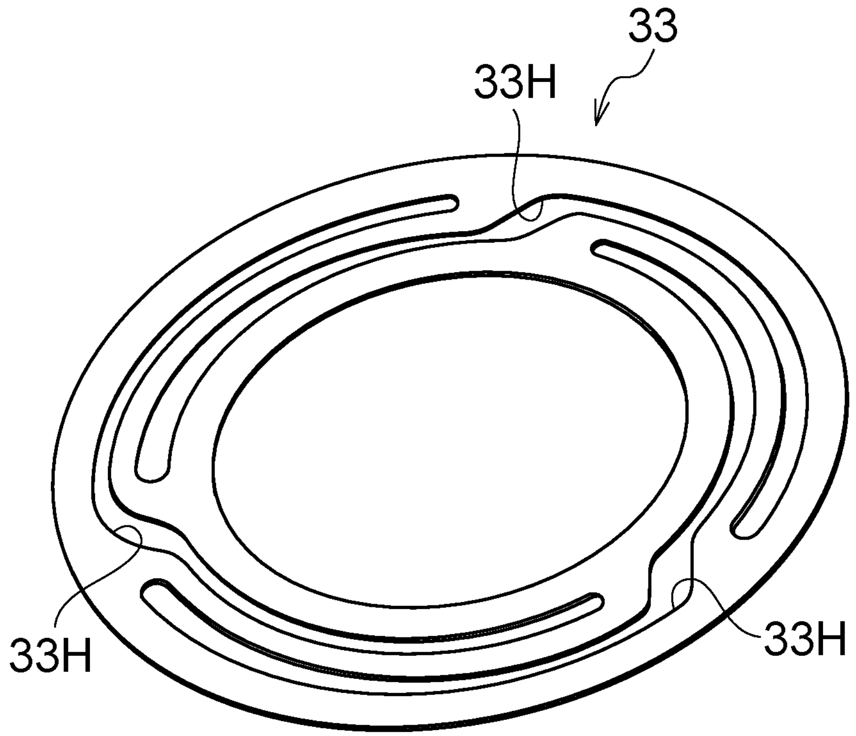
FIG. 7 is a perspective view illustrating a leaf spring (butterfly damper) applied as a second suspension of the electroacoustic transducer unit of FIG. 6.

As illustrated in FIG. 1, a second suspension 32 is provided in front of the first suspension 30 inside the housing 14. The second suspension 32 is formed in an annular shape in front view, and connects the cylindrical portion 22B of the yoke 22, which is a part of the magnetic circuit unit 20, and a portion on the inner surface side of the housing 14. The second suspension 32 is an element that can be grasped as a mechanical filter having a function of passing low-frequency vibration and blocking high-frequency vibration. Examples of a member corresponding to the second suspension 32 include a known spider and a metal leaf spring (also referred to as "butterfly damper"). See FIG. 7 for a detailed description. FIG. 7 of a third exemplary embodiment described later illustrates a leaf spring (second suspension 33).

As illustrated in FIG. 1, the electroacoustic transducer 10 includes the second diaphragm 38. The direction of a front surface 38A of the second diaphragm 38 is the same as the front side (see the direction of the arrow FR) of the electroacoustic transducer 10. The housing 14 of the electroacoustic transducer unit 12 described above is disposed on the front surface 38A side of the second diaphragm 38, and the attachment portion 14A of the housing 14 is attached to the second diaphragm 38. As the attachment portion 14A of the housing 14 is attached to the second diaphragm 38 in this manner, the first diaphragm 28 is connected to the second diaphragm 38 via the first suspension 30 and the housing 14, and the magnetic circuit unit 20 is connected to the second diaphragm 38 via the second suspension 32 and the housing 14.

The second diaphragm 38 has a larger area than the first diaphragm 28, and can vibrate in the front-rear direction in a wider range than the first diaphragm 28. Examples of the second diaphragm 38 include a table, a dashboard of a vehicle, and an A-pillar.

In summary, the electroacoustic transducer unit 12 is used in the electroacoustic transducer 10 in which the second diaphragm 38 can radiate a sound to the external space S1 on the front surface 38A side in a case in which the drive unit 16 generates vibration in an attached state where the attachment portion 14A of the housing 14 is attached to the second diaphragm 38. In the drawing, a propagation direction of a sound from the front surface 38A of the second diaphragm 38 is simplified and indicated by a white arrow b.

Meanwhile, the electroacoustic transducer unit 12 has a port (also referred to as "sound path") 36 capable of guiding a component of at least a partial frequency band of a sound radiated from the front surface 28A of the first diaphragm 28 in a direction opposite to a direction in which the front surface 38A of the second diaphragm 38 faces to the external space S1 on the front surface 38A side of the second diaphragm 38, in a case in which the drive unit 16 generates vibration in the attached state where the attachment portion 14A of the housing 14 is attached to the second diaphragm 38. Further, as the port 36 is provided, the electroacoustic transducer unit 12 is configured such that, a sound pressure of a synthesized sound in the vicinity of a crossover frequency of radiated sounds from the first diaphragm 28 and the second diaphragm 38, in a case in which the drive unit 16 generates vibration in the attached state, in which the attachment portion 14A of the housing 14 is attached to the second diaphragm 38, is equal to or higher than a sound pressure of the radiated sound from only one of the first diaphragm 28 and the second diaphragm 38 at the crossover frequency.

In other words, as the port 36 that guides the component of at least a partial frequency band of the sound radiated from the front surface 28A of the first diaphragm 28 in the direction opposite to the direction in which the front surface 38A of the second diaphragm 38 faces to the external space S1 on the front surface 38A side of the second diaphragm 38 is provided, the electroacoustic transducer 10 is configured such that the sound pressure of the synthesized sound in the vicinity of the crossover frequency of the radiated sounds from the first diaphragm 28 and the second diaphragm 38, in a case in which the drive unit 16 generates vibration is equal to or higher than the sound pressure of the radiated sound from only one of the first diaphragm 28 and the second diaphragm 38 at the crossover frequency.

In the exemplary embodiment, as an example, the port 36 is implemented by a through-hole formed at a portion of the peripheral wall portion 14S on a rear end portion side and having a circumferential direction of the peripheral wall portion 14S as a longitudinal direction. A large number of ports 36 are formed in such a way as to be arranged in the circumferential direction of the peripheral wall portion 14S, and are set, in such a way as to guide all radiated sounds from the front surface 28A of the first diaphragm 28 to the external space S1 on the front surface 38A side of the second diaphragm 38.

Figure 2:
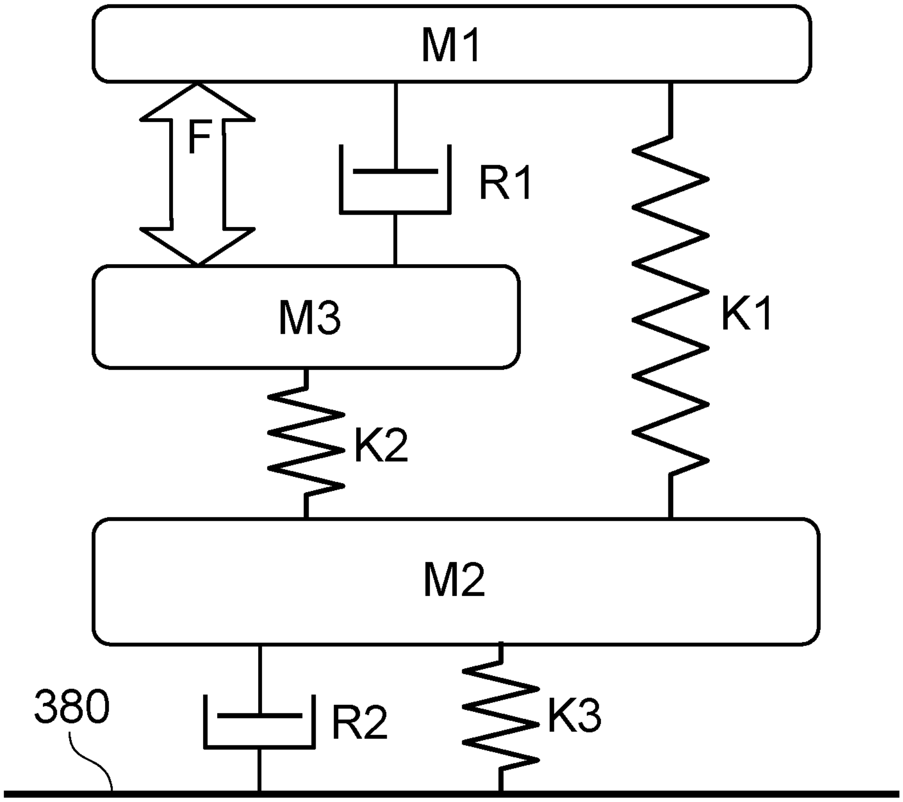
FIG. 2 is a diagram illustrating a vibration model of the electroacoustic transducer of FIG. 1.

Here, simulation for a sound pressure frequency characteristic of the electroacoustic transducer 10 will be supplementary described with reference to FIG. 2. FIG. 2 illustrates a vibration model of the electroacoustic transducer 10 of FIG. 1. In other words, the electroacoustic transducer 10 illustrated in FIG. 1 is replaced with the vibration model including mechanical elements illustrated in FIG. 2.

In FIG. 2, reference number 380 corresponds to a fixed portion of the second diaphragm 38. K3 corresponds to the hardness of the fixed portion of the second diaphragm 38, R2 corresponds to the damping resistance of the fixed portion of the second diaphragm 38, and M2 corresponds to the mass on a second diaphragm 38 side. K1 corresponds to the hardness of the first suspension 30, and K2 corresponds to the hardness of the second suspension 32. M3 corresponds to the mass of the magnetic circuit unit 20 (the larger mass between the mass of the magnetic circuit unit 20 and the mass of the voice coil unit 18 in the drive unit 16), F corresponds to the driving force of the drive unit 16, and R1 corresponds to the damping resistance generated in the drive unit 16. M1 corresponds to the mass on a first diaphragm 28 side.

Vibration speed characteristics of the first diaphragm 28 and the second diaphragm 38 can be obtained from an electric circuit (equivalent circuit) created based on the vibration model illustrated in FIG. 2. Then, the sound pressure frequency characteristic of the electroacoustic transducer 10 at a predetermined listening position can be obtained based on the vibration speeds of the first diaphragm 28 and the second diaphragm 38.

Next, actions and effects of the first exemplary embodiment will be described.

In the electroacoustic transducer 10 illustrated in FIG. 1, the drive unit 16 is configured to cause the magnetic circuit unit 20 to generate an action force for the voice coil unit 18 in response to an electric input signal, and cause the voice coil unit 18 to apply a reaction force to the magnetic circuit unit 20, thereby generating vibration. The first diaphragm 28 is connected to the voice coil unit 18 having a smaller mass than the magnetic circuit unit 20. Therefore, when the voice coil unit 18 vibrates in response to an electric input signal, the first diaphragm 28 integrally vibrates. The first diaphragm 28 has a smaller area than the second diaphragm 38, and a high-frequency sound is reproduced from the first diaphragm 28.

The second diaphragm 38 to which the first diaphragm 28 is connected via at least the first suspension 30 is connected to the magnetic circuit unit 20 having a larger mass than the voice coil unit 18 via at least the second suspension 32. The second diaphragm 38 has a larger area than the first diaphragm 28, and can radiate a sound to the external space S1 on the front surface 38A side in a case in which the drive unit 16 generates vibration. Here, in a case in which the drive unit 16 generates vibration, vibration of the first diaphragm 28 that vibrates integrally with the voice coil unit 18 is input to the second diaphragm 38 via the first suspension 30 or the like, and a reaction force applied from the voice coil unit 18 to the magnetic circuit unit 20 is input to the second diaphragm 38 via the second suspension 32 or the like. As a result, in a case in which the drive unit 16 generates vibration, vibration in a low-frequency band is input to the second diaphragm 38. Therefore, generation of a resonance sound that is likely to occur in a high-frequency band is suppressed, and a low-frequency sound can be reproduced on the front surface 38A side of the second diaphragm 38.

As described above, in the electroacoustic transducer according to the exemplary embodiment, since it is possible to vibrate two diaphragms, that is, the first diaphragm 28 and the second diaphragm 38, with one drive unit 16, size reduction (space saving) and cost reduction can be achieved. Further, since the electroacoustic transducer unit 12 includes the attachment portion 14A for attachment to another member, the electroacoustic transducer unit 12 can be attached to various members, and various members can be used as the second diaphragm.

Moreover, as the port 36 that guides the component of at least a partial frequency band of the sound radiated from the first diaphragm 28 in the direction opposite to the direction in which the front surface 38A of the second diaphragm 38 faces to the external space S1 on the front surface 38A side of the second diaphragm 38 is provided, the electroacoustic transducer 10 of the exemplary embodiment is configured such that the sound pressure of the synthesized sound in the vicinity of the crossover frequency of the radiated sounds from the first diaphragm 28 and the second diaphragm 38, in a case in which the drive unit 16 generates vibration is equal to or higher than the sound pressure of the radiated sound from only one of the first diaphragm 28 and the second diaphragm 38 at the crossover frequency. As a result, it is possible to reproduce a high-quality sound by suppressing a decrease in sound pressure in an intermediate frequency band between a low-frequency sound and a high-frequency sound.

More specifically, in the exemplary embodiment, the direction of the front surface 28A of the first diaphragm 28 is set to be opposite to the direction of the front surface 38A of the second diaphragm 38. A sound from the rear surface 28B of the first diaphragm 28 is not radiated to the external space S1 on the front surface 38A side of the second diaphragm 38. The above-described port 36 guides a component of at least a partial frequency band of a sound radiated from the front surface 28A of the first diaphragm 28 in the direction opposite to the direction in which the front surface 38A of the second diaphragm 38 faces to the external space S1 on the front surface 38A side of the second diaphragm 38.

As a result, a sound from the electroacoustic transducer 10 is a synthesized sound of a sound from the front surface 38A of the second diaphragm 38 and at least a part of a sound from the front surface 28A of the first diaphragm 28 that faces a side opposite to a side that the front surface 38A of the second diaphragm 38 faces. Here, in an intermediate frequency band between a low-frequency sound and a high-frequency sound, the phase of a sound from the front surface 38A of the second diaphragm 38 and the phase of a sound from the front surface 28A of the first diaphragm 28 are not opposite to each other, as a result of which a decrease in sound pressure in the intermediate frequency band between the low-frequency sound and the high-frequency sound is suppressed as compared with a conventional technology (the above-described related art).

Figure 3:
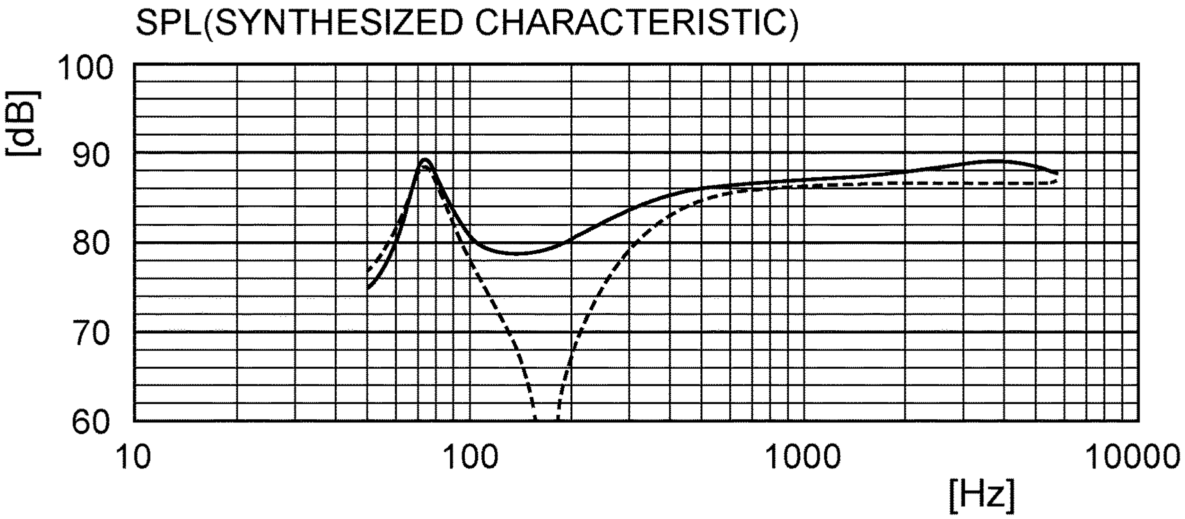
FIG. 3 is a graph illustrating sound pressure frequency characteristics of the electroacoustic transducer of FIG. 1 and a comparative example.
Figure 4A:
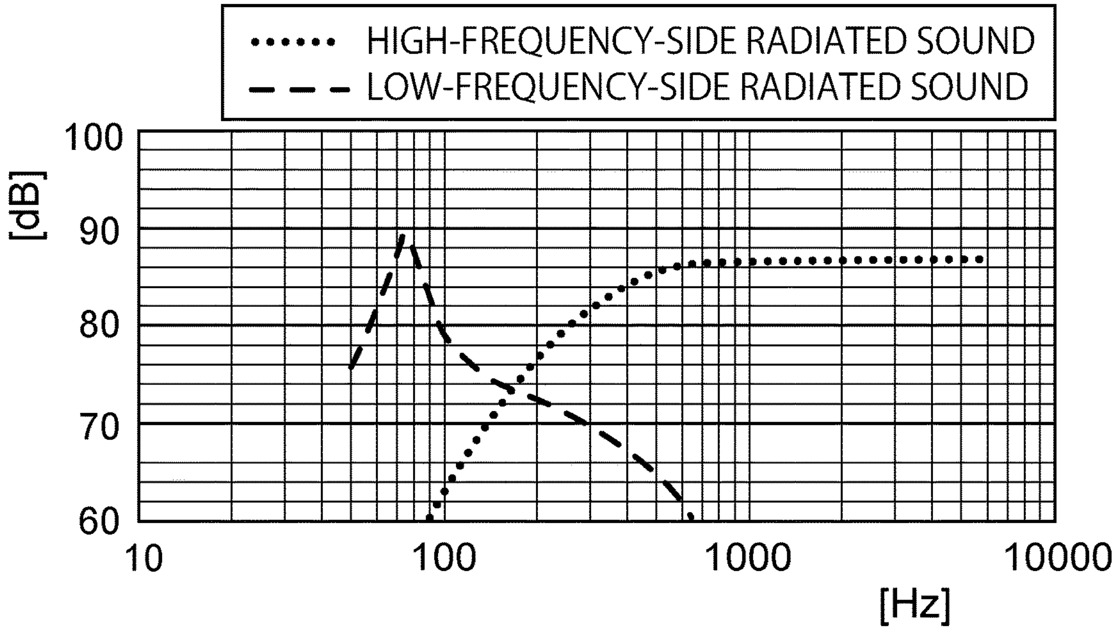
FIG. 4A is a graph illustrating sound pressure frequency characteristics of a high-frequency-side radiated sound and a low-frequency-side radiated sound in the comparative example.
Figure 4B:
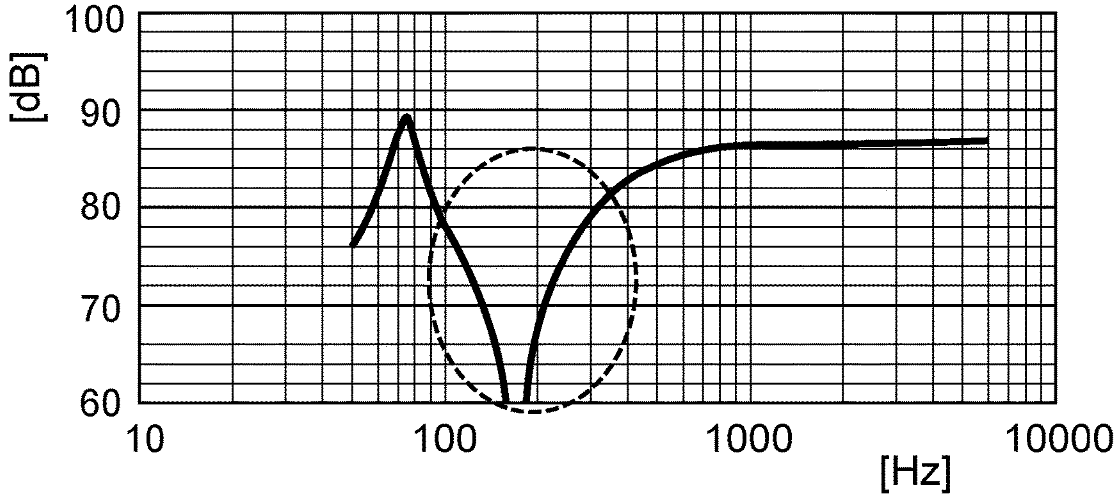
FIG. 4B is a graph illustrating the sound pressure frequency characteristic in the comparative example.

This point will be supplementary described with reference to FIGS. 3, 4A, and 4B. In FIGS. 3, 4A, and 4B, each horizontal axis represents frequency in a logarithmic representation, and each vertical axis represents sound pressure. FIG. 3 is a graph illustrating sound pressure frequency characteristics of the electroacoustic transducer 10 of the exemplary embodiment and a comparative example. A solid line in the graph of FIG. 3 indicates the sound pressure frequency characteristic of the electroacoustic transducer 10 of the exemplary embodiment, and a broken line indicates the sound pressure frequency characteristic of the comparative example. FIG. 4A is a graph illustrating sound pressure frequency characteristics of a high-frequency-side radiated sound and a low-frequency-side radiated sound in the comparative example, and FIG. 4B is a graph illustrating the sound pressure frequency characteristic in the comparative example.

In the comparative example, an exciter with a diaphragm is installed on a flat plate, and the front and rear of the electroacoustic transducer unit 12 in the electroacoustic transducer 10 illustrated in FIG. 1 are arranged in reverse, and an opening portion for sound emission is formed to penetrate through only a side of the housing 14 that faces the first diaphragm 28. A dotted line (. . . ) in the graph of FIG. 4A indicates a sound pressure due to vibration of the diaphragm of the exciter (in other words, a sound pressure of a high-frequency-side radiated sound), and a broken line (---) indicates a sound pressure due to vibration of the flat plate excited by the exciter (in other words, a sound pressure of a low-frequency-side radiated sound).

In the comparative example, a high-frequency sound is reproduced by the vibration of the diaphragm of the exciter (see the dotted line in FIG. 4A), and the low-frequency sound is reproduced by the vibration of the flat plate excited by the exciter (see the broken line in FIG. 4A). Here, as a frequency of a sound from the front surface of the diaphragm of the exciter is lower than a low frequency limit of the diaphragm, the sound pressure becomes lower and the phase of the sound pressure in a case in which the phase of the applied voltage is used as a reference advances. On the other hand, as a frequency of a sound from the front surface of the flat plate excited by the exciter is higher than a high frequency limit of the diaphragm, the sound pressure becomes lower and the phase of the sound pressure in a case in which the phase of the applied voltage is used as a reference lags. As a result, in an intermediate frequency band between a low-frequency sound and a high-frequency sound (in other words, in the vicinity of the crossover frequency), the phase of a sound from the front surface of the diaphragm of the exciter is opposite to the phase of a sound from the front surface of the flat plate excited by the exciter. Therefore, a band (dip) in which the sound pressure greatly decreases occurs as illustrated in FIG. 4B. In FIG. 4B, a portion where the sound pressure greatly decreases is surrounded by a broken line.

On the other hand, in the electroacoustic transducer 10 of the exemplary embodiment, a sound from the front surface 38A of the second diaphragm 38 and at least a part of a sound from the front surface 28A of the first diaphragm 28 that faces the side opposite to the side that the front surface 38A of the second diaphragm 38 faces are synthesized and radiated in such a way that the phase of a sound from the first diaphragm 28 and the phase of a sound from the second diaphragm 38 illustrated in FIG. 1 are not opposite to each other in an intermediate frequency band between a low-frequency sound and a high-frequency sound. Therefore, in the electroacoustic transducer 10 of the exemplary embodiment, a decrease in sound pressure in an intermediate frequency band between a low-frequency sound and a high-frequency sound is suppressed as compared with the comparative example as illustrated by the solid line in FIG. 3.

As described above, according to the exemplary embodiment, it is possible to reproduce a high-quality sound by suppressing a decrease in sound pressure in an intermediate frequency band between a low-frequency sound and a high-frequency sound while achieving size reduction.

Second Exemplary Embodiment

Figure 5:
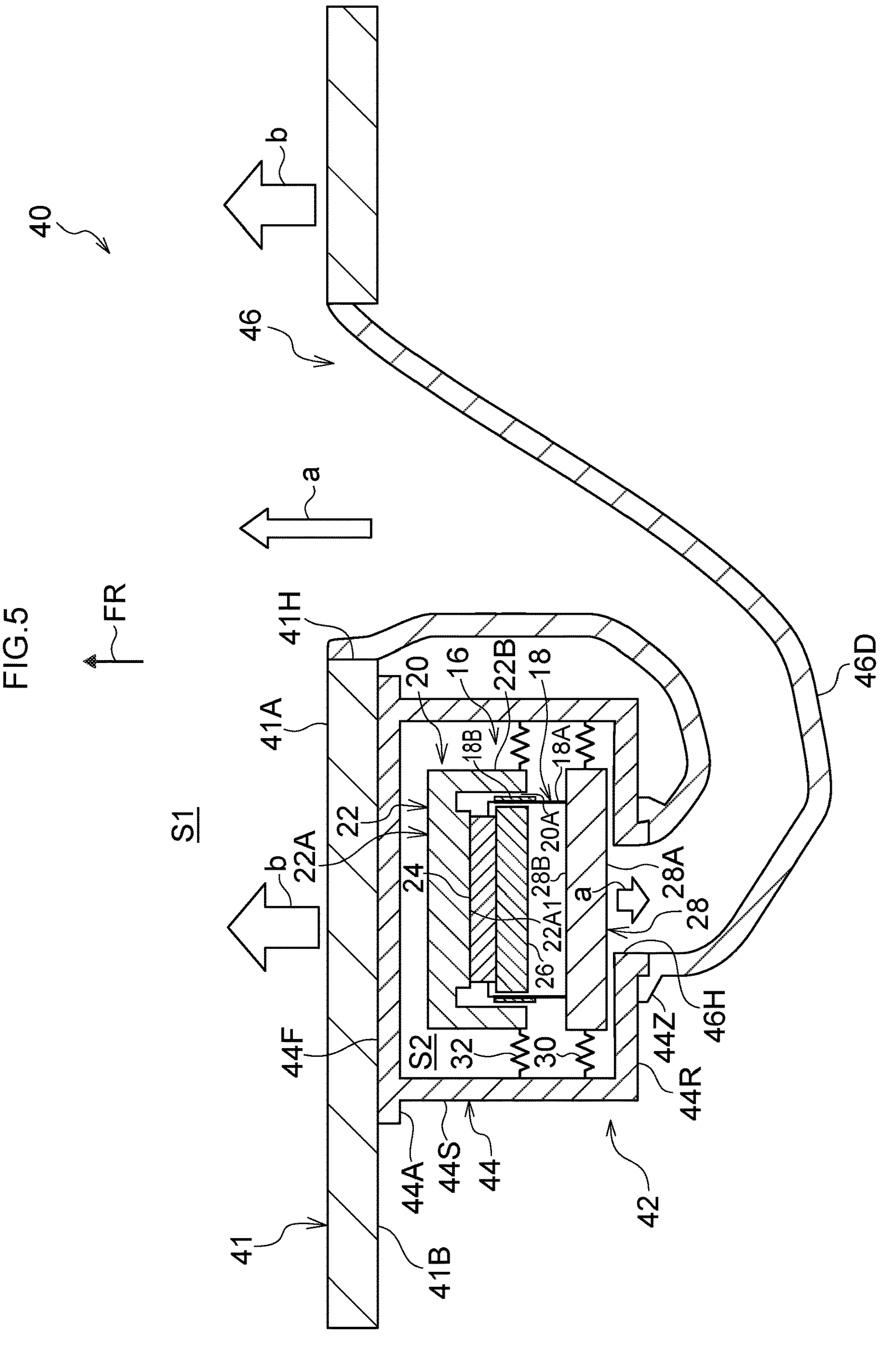
FIG. 5 is a schematic cross-sectional view illustrating an electroacoustic transducer including an electroacoustic transducer unit according to a second exemplary embodiment of the present disclosure.

Next, an electroacoustic transducer including an electroacoustic transducer unit according to a second exemplary embodiment of the present disclosure will be described with reference to FIG. 5. FIG. 5 is a schematic cross-sectional view of an electroacoustic transducer 40 including an electroacoustic transducer unit 42 according to the second exemplary embodiment. In the second exemplary embodiment, components substantially similar to those of the first exemplary embodiment are denoted by the same reference numerals, if appropriate, and a description thereof is omitted. A cavity S2 on a rear surface 28B side of a first diaphragm 28 is denoted by the same reference numeral as that of the first exemplary embodiment for convenience (the same applies to third to ninth exemplary embodiments).

The electroacoustic transducer unit 42 includes a housing 44 instead of the housing 14 (see FIG. 1) of the electroacoustic transducer unit 12 of the first exemplary embodiment. The housing 44 includes a front wall portion 44F disposed on a front side, a rear wall portion 44R disposed on a rear side opposite to the front wall portion 44F, and a cylindrical peripheral wall portion 44S connecting an outer peripheral end portion of the front wall portion 44F and an outer peripheral end portion of the rear wall portion 44R. Similarly to the peripheral wall portion 14S of the first exemplary embodiment (see FIG. 1), an outer peripheral portion of a first suspension 30 and an outer peripheral portion of a second suspension 32 are joined to the peripheral wall portion 44S.

An attachment portion 44A for attachment to another member is provided on the housing 44. As an example, the attachment portion 44A projects in a flange shape in such a way as to be orthogonal to the front-rear direction from a portion where the front wall portion 44F and the peripheral wall portion 14S intersect. The housing 44 is disposed on a rear surface 41B side of a second diaphragm 41, and the attachment portion 44A of the housing 44 is attached to the second diaphragm 41. The second diaphragm 41 has a larger area than the first diaphragm 28. As the attachment portion 44A of the housing 44 is attached to the second diaphragm 41, the first diaphragm 28 is connected to the second diaphragm 41 via the first suspension 30 and the housing 44, and a magnetic circuit unit 20 is connected to the second diaphragm 41 via the second suspension 32 and the housing 44. In a case in which a drive unit 16 generates vibration, the second diaphragm 41 can radiate a sound into an external space S1 on a front surface 41A side (see an arrow b).

The electroacoustic transducer 40 is configured by attaching the attachment portion 44A of the housing 44 in the electroacoustic transducer unit 42 to the second diaphragm 41 in the above-described state. The electroacoustic transducer 40 is configured such that the direction of a front surface 28A of the first diaphragm 28 is set to be opposite to the direction of the front surface 41A of the second diaphragm 41, and a sound from the rear surface 28B of the first diaphragm 28 is not radiated to the external space S1 on the front surface 41A side of the second diaphragm 41.

On the other hand, a hole 46H is formed to penetrate through the rear wall portion 44R of the housing 44 in the electroacoustic transducer unit 42 in such a way as to correspond to the central portion of the front surface 28A of the first diaphragm 28 A short cylindrical horn attachment portion 44Z protruding rearward is formed around the hole 46H on a rear surface side of the rear wall portion 44R. One end portion of a horn 46D included as a part of the electroacoustic transducer unit 42 is attached to an outer peripheral portion of the horn attachment portion 44Z. The horn 46D is formed in a substantially J shape. A front portion of the horn 46D is formed in a shape gradually increasing in diameter toward an end portion side of the second diaphragm 41. A front end portion of the horn 46D is connected to a hole 41H formed in the second diaphragm 41 by press-fitting, for example. An attachment portion for attachment to the second diaphragm 41 may be separately provided at a portion on a front end portion side of the horn 46D. The hole 41H is formed to penetrate through the second diaphragm 41 in the vicinity of a portion where the electroacoustic transducer unit 42 is installed.

The hole 46H and the horn 46D of the housing 44 constitute a port 46 of the present exemplary embodiment. The port 46 is configured to guide a component of at least a partial frequency band (for example, the entire frequency band) of a sound radiated from the front surface 28A of the first diaphragm 28 in a direction opposite to a direction in which the front surface 41A of the second diaphragm 41 faces to the external space S1 on the front surface 41A side of the second diaphragm 41. As the port 46 is provided, the electroacoustic transducer 40 is configured such that a sound pressure of a synthesized sound in the vicinity of a crossover frequency of radiated sounds from the first diaphragm 28 and the second diaphragm 41, in a case in which the drive unit 16 generates vibration is equal to or higher than a sound pressure of the radiated sound from only one of the first diaphragm 28 and the second diaphragm 41 at the crossover frequency.

The configuration of the second exemplary embodiment described above can also provide substantially similar actions and effects to those of the first exemplary embodiment described above. In the exemplary embodiment, it is not necessary to provide a portion protruding forward from the second diaphragm 41, so that a simple form can be implemented.

Third Exemplary Embodiment

Figure 6:
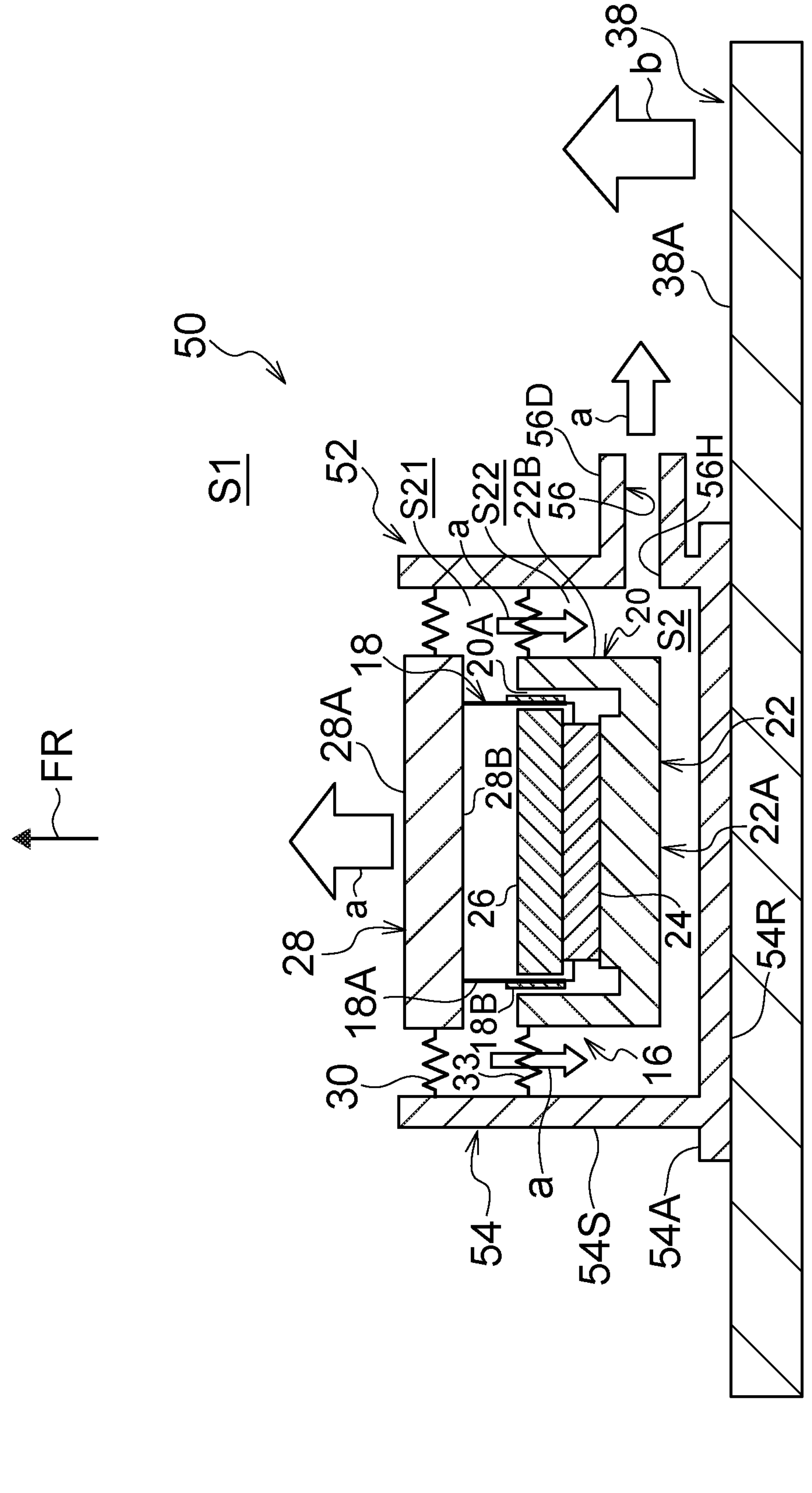
FIG. 6 is a schematic cross-sectional view illustrating an electroacoustic transducer including an electroacoustic transducer unit according to a third exemplary embodiment of the present disclosure.

Next, an electroacoustic transducer including an electroacoustic transducer unit according to the third exemplary embodiment of the present disclosure will be described with reference to FIGS. 6 to 9B. FIG. 6 is a schematic cross-sectional view of an electroacoustic transducer 50 including an electroacoustic transducer unit 52 according to the third exemplary embodiment. Components substantially similar to those of the first exemplary embodiment are denoted by the same reference numerals, if appropriate, and a description thereof is omitted.

The electroacoustic transducer unit 52 includes a housing 54 instead of the housing 14 (see FIG. 1) of the electroacoustic transducer unit 12 of the first exemplary embodiment. The housing 54 includes a rear wall portion 54R disposed on a rear side and a cylindrical peripheral wall portion 54S erected from an outer peripheral portion of the rear wall portion 54R. The rear wall portion 54R of the housing 54 is a component substantially similar to the rear wall portion 14R of the housing 14 of the first exemplary embodiment (see FIG. 1).

An attachment portion 54A for attachment to another member is provided on the housing 54. As an example, the attachment portion 54A projects in a flange shape in such a way as to be orthogonal to the front-rear direction from a portion where the rear wall portion 54R and the peripheral wall portion 54S intersect. The housing 54 is disposed on a front surface 38A side of a second diaphragm 38, and the attachment portion 54A of the housing 54 is attached to the second diaphragm 38. Therefore, the electroacoustic transducer 50 is configured by attaching the electroacoustic transducer unit 52 to the second diaphragm 38.

When viewed with reference to the rear wall portion 54R, the front and rear of components inside the housing 54 are arranged in an opposite direction from those of the components inside the housing 14 (see FIG. 1) of the first exemplary embodiment. However, the other points are substantially similar to the components inside the housing 14 of the first exemplary embodiment except that a second suspension 33 is provided instead of the second suspension 32 (see FIG. 1). Therefore, the components inside the housing 54 are denoted by the same reference numerals as the components inside the housing 14 (see FIG. 1) of the first exemplary embodiment for the sake of convenience except for the second suspension 33, and a description thereof is omitted if appropriate.

The electroacoustic transducer 50 is configured such that the direction of a front surface 28A of a first diaphragm 28 is matched with the direction of the front surface 38A of the second diaphragm 38, so that a sound can be radiated from the front surface 28A of the first diaphragm 28 to an external space S1 on the front surface 38A side of the second diaphragm 38. A first suspension 30 connects an outer peripheral portion of the first diaphragm 28 and the housing 54. Accordingly, in the electroacoustic transducer 50, the first diaphragm 28 is connected to the second diaphragm 38 via the first suspension 30 and the housing 54. A drive unit 16 is disposed on a rear surface 28B side of the first diaphragm 28.

The second suspension 33 connects an outer peripheral portion of a magnetic circuit unit 20 and the housing 54. Accordingly, in the electroacoustic transducer 50, the magnetic circuit unit 20 is connected to the second diaphragm 38 via the second suspension 33 and the housing 54. The second diaphragm 38 can radiate a sound to the external space S1 on the front surface 38A side in a case in which the drive unit 16 generates vibration.

FIG. 7 is a perspective view illustrating a leaf spring (butterfly damper) applied as the second suspension 33. As a material of the second suspension 33 illustrated in FIG. 7, for example, a metal material such as stainless steel or a synthetic resin material such as bakelite can be applied. As illustrated in FIG. 7, the second suspension 33 is formed in an annular shape in front view, and communication holes 33H as a plurality of communication portions are formed to penetrate through the second suspension 33. As an example, the plurality of communication holes 33H extend along a circumferential direction of the second suspension 33. The communication holes 33H allow two spaces S21 and S22 partitioned by the second suspension 33 to communicate with each other in a cavity S2 on the rear surface 28B side of the first diaphragm 28 illustrated in FIG. 6.

A port 56 is continuously provided at a rear end portion of the peripheral wall portion 54S of the housing 54. As an example, the port 56 is formed by a through-hole 56H formed at the rear end portion of the peripheral wall portion 54S of the housing 54, and a cylindrical duct 56D formed continuously with the through-hole 56H and extending in a direction orthogonal to the front-rear direction.

The port 56 is configured to guide a component of a partial frequency band of a sound radiated from the rear surface 28B of the first diaphragm 28 into the cavity S2 on the rear surface 28B side of the first diaphragm 28 (in other words, a sound radiated from the rear surface 28B of the first diaphragm 28 in a direction opposite to a direction in which the front surface 38A of the second diaphragm 38 faces) to the external space S1 on the front surface 38A side of the second diaphragm 38.

Figure 9A:
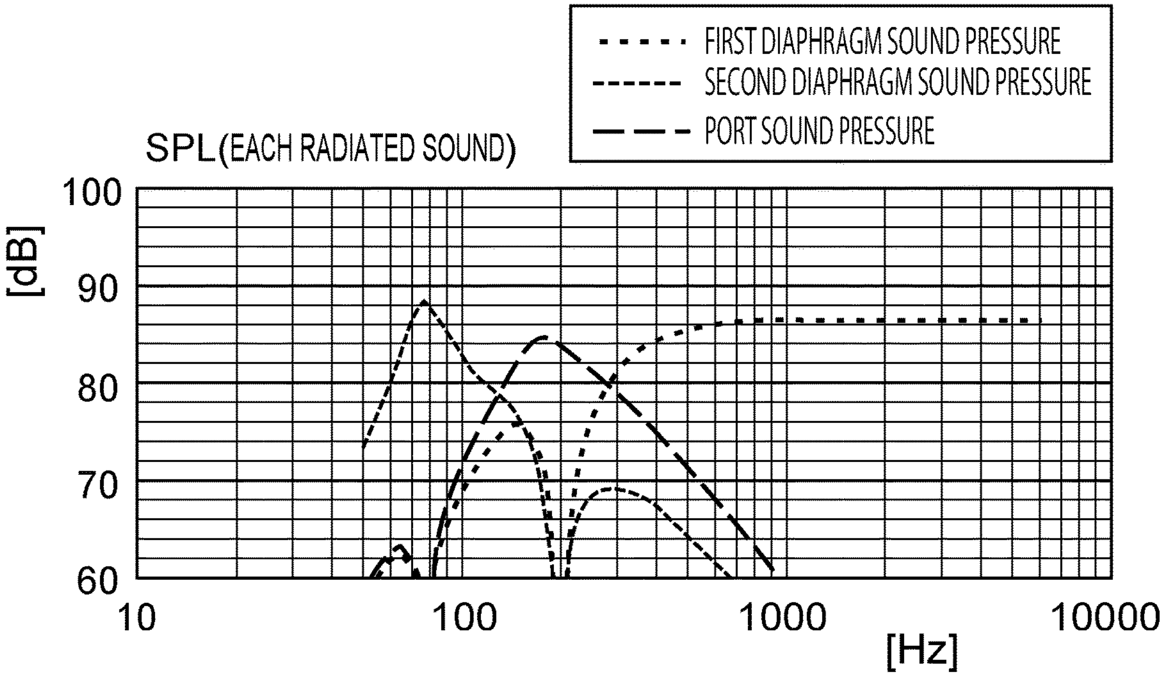
FIG. 9A is a graph illustrating a sound pressure frequency characteristic of a sound from each of a front surface of a first diaphragm, a front surface of a second diaphragm, and a port of the electroacoustic transducer of FIG. 6.
Figure 9B:
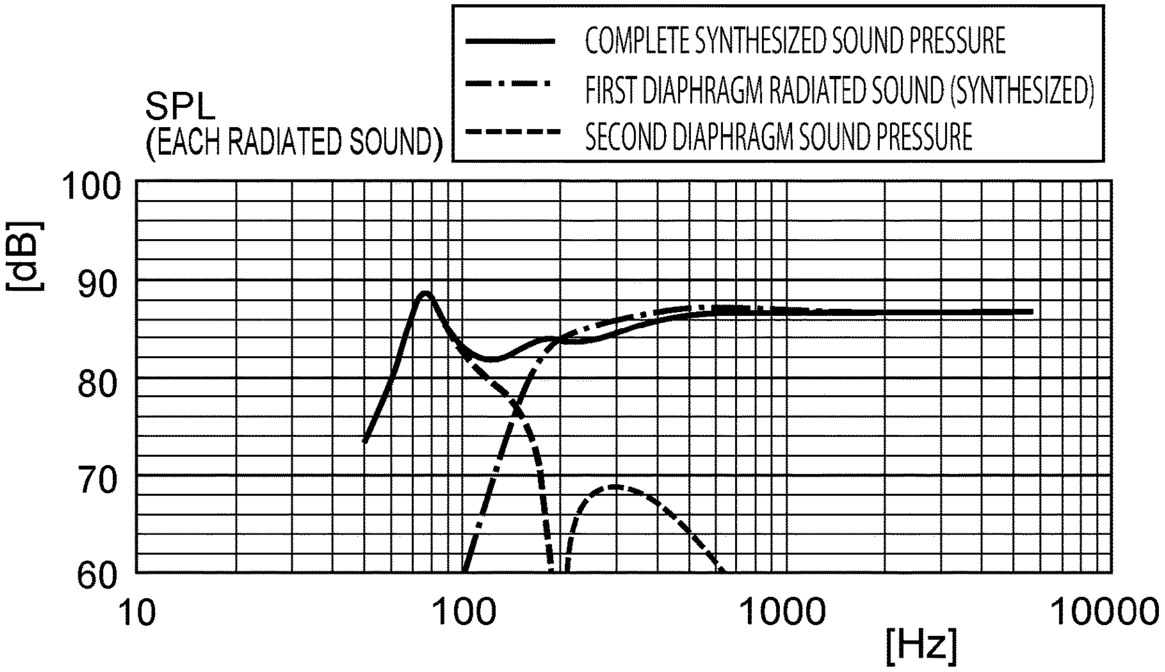
FIG. 9B is a graph illustrating sound pressure frequency characteristics of a complete synthesized sound of sounds output from the electroacoustic transducer of FIG. 6, a radiated sound from the first diaphragm (a synthesized sound of the sound from the front surface of the first diaphragm and the sound from the port), and the sound from the front surface of the second diaphragm.

FIG. 9B is a graph illustrating sound pressure frequency characteristics of a complete synthesized sound of sounds output from the electroacoustic transducer 50, a radiated sound from the first diaphragm 28 (a synthesized sound of the sound from the front surface 28A of the first diaphragm 28 and the sound from the port 56), and the sound from the front surface 38A of the second diaphragm 38. In FIG. 9B, each horizontal axis represents frequency in a logarithmic representation, and each vertical axis represents sound pressure. A solid line in the graph of FIG. 9B indicates a sound pressure of the complete synthesized sound of the sounds output from the electroacoustic transducer 50, a line with alternating long and short dashes indicates a sound pressure of the radiated sound from the first diaphragm 28 (the synthesized sound of the sound from the front surface 28A of the first diaphragm 28 and the sound from the port 56), and a broken line indicates a sound pressure of the sound from the front surface 38A of the second diaphragm 38. As can be seen from the graph illustrated in FIG. 9B, as the port 56 is provided, the electroacoustic transducer 50 is configured such that the sound pressure of the synthesized sound in the vicinity of the crossover frequency of the radiated sounds from the first diaphragm 28 and the second diaphragm 38, in a case in which the drive unit 16 generates vibration is equal to or higher than (more specifically, higher than) the sound pressure of the radiated sound from only one of the first diaphragm 28 and the second diaphragm 38 at the crossover frequency (as illustrated in FIG. 9B, a sound pressure at an intersection between the line with alternating long and short dashes and the broken line).

More specifically, the port 56 illustrated in FIG. 6 is set to be able to output a sound in an intermediate frequency band between a low-frequency sound and a high-frequency sound by utilizing resonance between an air spring in the cavity S2 on the rear surface 28B side of the first diaphragm 28 and the mass of air in the port 56. The principle and setting for outputting a sound in a predetermined frequency band are similar to those in the case of a known bass reflex port, and thus a detailed description will be omitted.

Next, actions and effects of the third exemplary embodiment will be described.

In the electroacoustic transducer 50 illustrated in FIG. 6, when the drive unit 16 generates vibration in response to an electric input signal, the first diaphragm 28 vibrates integrally with a voice coil unit 18. Therefore, a high-frequency sound is reproduced forward from the front surface 28A of the first diaphragm 28. At this time, the second diaphragm 38 vibrates in response to vibration of the electroacoustic transducer unit 52. Accordingly, a low-frequency sound is reproduced forward from the front surface 38A of the second diaphragm 38.

Further, the port 56 provided continuously with the housing 54 guides a component of a partial frequency band of a sound radiated from the rear surface 28B of the first diaphragm 28 into the cavity S2 on the rear surface 28B side of the first diaphragm 28 to the external space S1 on the front surface 38A side of the second diaphragm 38. As a result, a sound from the rear surface 28B of the first diaphragm 28 is added to a frequency band of a dip in the sound pressure frequency characteristic, in a case in which a sound from the front surface 28A of the first diaphragm 28 and a sound from the front surface 38A of the second diaphragm 38 are synthesized, and a decrease in sound pressure in an intermediate frequency band between a low-frequency sound and a high-frequency sound is suppressed as compared with the conventional technology (the above-described related art).

Figure 8:
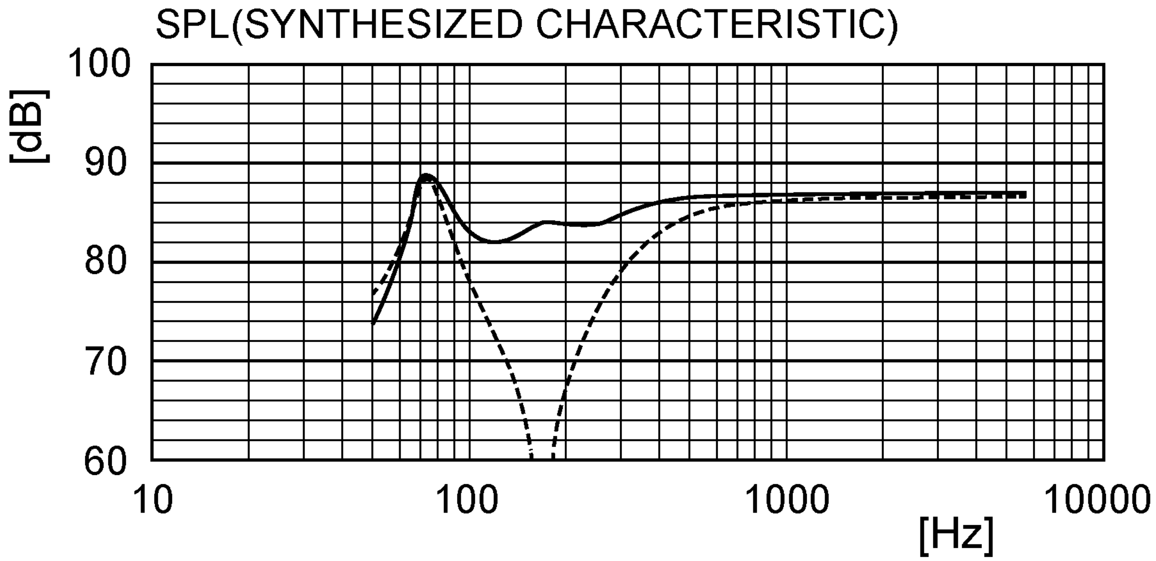
FIG. 8 is a graph illustrating sound pressure frequency characteristics of the electroacoustic transducer of FIG. 6 and the comparative example.

This point will be supplementary described with reference to FIGS. 8 and 9A. In FIGS. 8 and 9A, each horizontal axis represents frequency in a logarithmic representation, and each vertical axis represents sound pressure. FIG. 8 is a graph illustrating sound pressure frequency characteristics of the electroacoustic transducer 50 of the exemplary embodiment and a comparative example. A solid line in FIG. 8 indicates the sound pressure frequency characteristic of the electroacoustic transducer 50 of the exemplary embodiment, and a broken line indicates the sound pressure frequency characteristic of the comparative example. The comparative example is the same as the comparative example described above in the description of FIG. 3. FIG. 9A is a graph illustrating a sound pressure frequency characteristic of a sound from each of the front surface 28A of the first diaphragm 28, the front surface 38A of the second diaphragm 38, and the port 56 of the electroacoustic transducer 50. A dotted line in the graph of FIG. 9A indicates a sound pressure of the sound from the front surface 28A of the first diaphragm 28, a thin broken line indicates a sound pressure of the sound from the front surface 38A of the second diaphragm 38, and a bold broken line indicates a sound pressure of the sound from the port 56.

As illustrated in FIG. 9A, the sound from the port 56 is added to an intermediate frequency band between a low-frequency sound and a high-frequency sound. The phase of the sound from the port 56 is not opposite to the phase of the sound from the front surface 38A of the second diaphragm 38. As a result, when the sounds from the front surface 28A of the first diaphragm 28, the front surface 38A of the second diaphragm 38, and the port 56 of the electroacoustic transducer 50 are synthesized, a decrease in sound pressure in an intermediate frequency band between a low-frequency sound and a high-frequency sound is suppressed as compared with the comparative example as illustrated in FIG. 8.

Further, the communication holes 33H (see FIG. 7) allowing two spaces S21 and S22 partitioned by the second suspension 33 to communicate with each other in the cavity S2 on the rear surface 28B side of the first diaphragm 28 illustrated in FIG. 6 are formed. Therefore, a resonance frequency of a sound from the rear surface 28B of the first diaphragm 28 can be adjusted by effectively using not only air in one space S21 that is in contact with the rear surface 28B of the first diaphragm 28 but also air in the other space S22 of the two spaces S21 and S22 partitioned by the second suspension 33 in the cavity S2 on the rear surface 28B side of the first diaphragm 28.

As described above, according to the third exemplary embodiment, it is also possible to reproduce a high-quality sound by suppressing a decrease in sound pressure in an intermediate frequency band between a low-frequency sound and a high-frequency sound while achieving size reduction.

Figure 10:
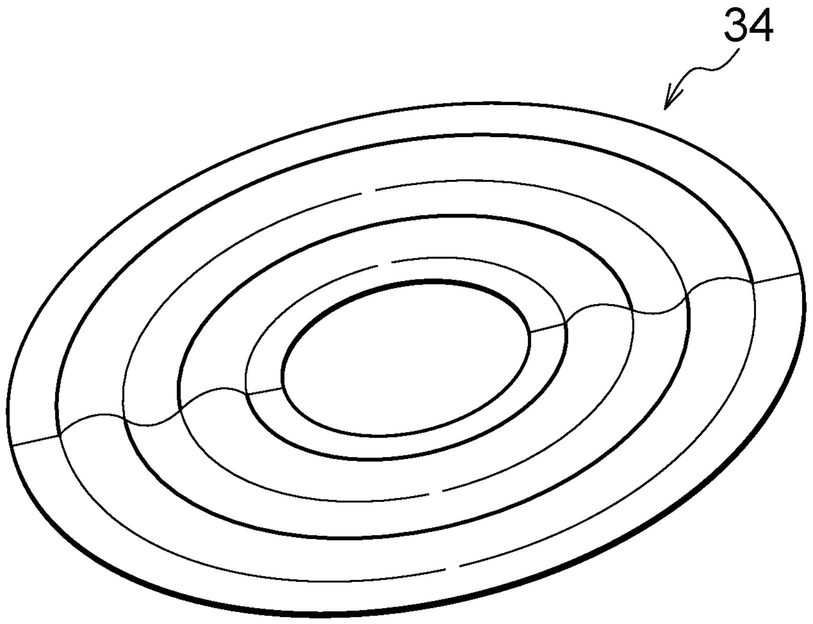
FIG. 10 is a perspective view illustrating a spider (damper) applicable as a second suspension of the third exemplary embodiment.

A spider (also referred to as a "damper") 34 illustrated in FIG. 10 may be applied as the second suspension instead of the second suspension 33 (see FIG. 7) of the third exemplary embodiment. As illustrated in FIG. 10, the spider 34 is formed in an annular shape and a ripple shape (a concentric waveform shape) in front view. For example, the spider 34 is formed by hot-press-molding a material in which a woven fabric such as cotton or chemical fiber is impregnated with a thermosetting resin. The spider 34 has a gap between threads of the woven fabric and has air permeability. FIG. 10 does not illustrate the gap in the spider 34.

Fourth Exemplary Embodiment

Figure 11:
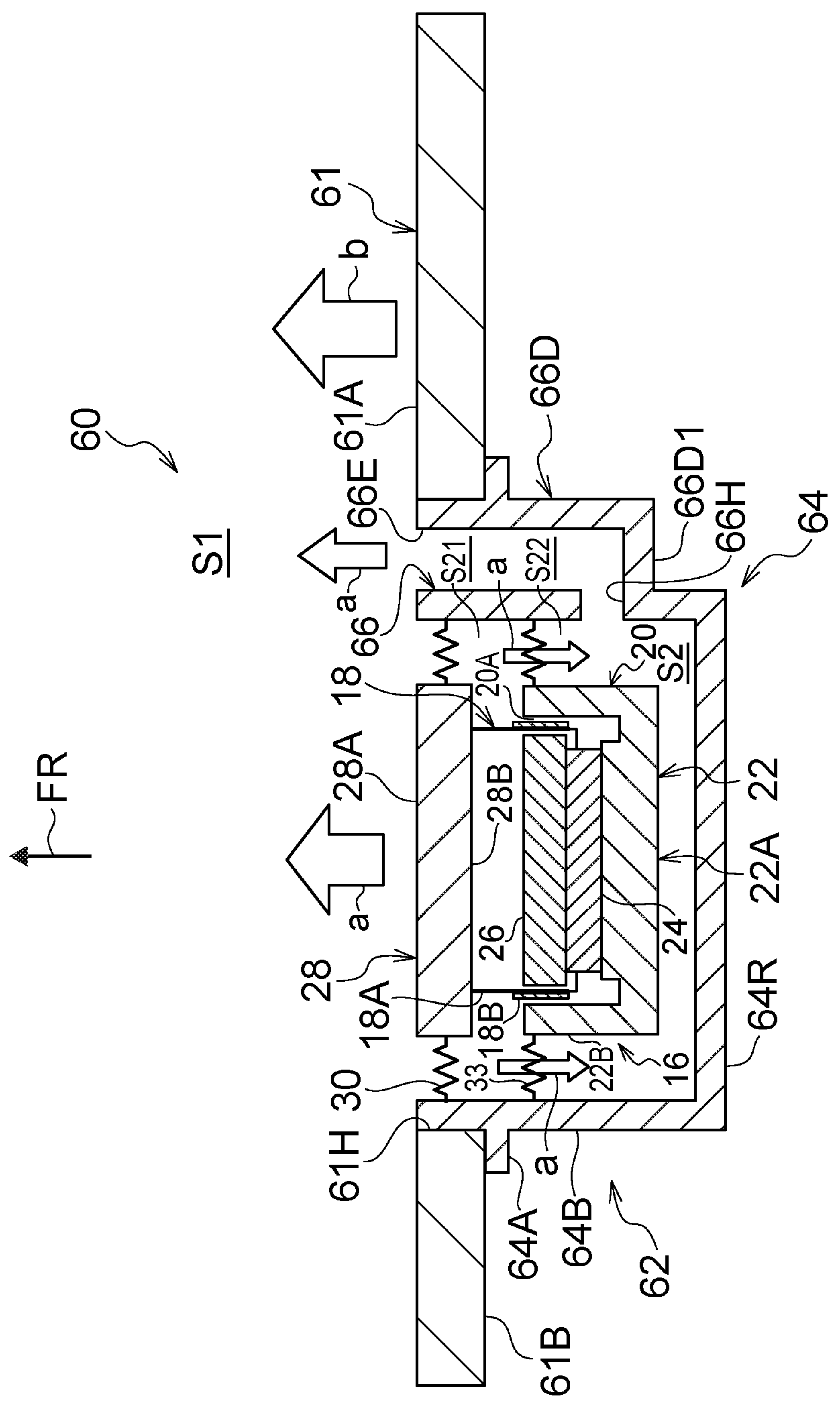
FIG. 11 is a schematic cross-sectional view illustrating an electroacoustic transducer including an electroacoustic transducer unit according to a fourth exemplary embodiment of the present disclosure.

Next, an electroacoustic transducer including an electroacoustic transducer unit according to a fourth exemplary embodiment of the present disclosure will be described with reference to FIG. 11. FIG. 11 is a schematic cross-sectional view of an electroacoustic transducer 60 including an electroacoustic transducer unit 62 according to the fourth exemplary embodiment. Components substantially similar to those of the third exemplary embodiment are denoted by the same reference numerals, if appropriate, and a description thereof is omitted.

The electroacoustic transducer unit 62 includes a housing 64 instead of the housing 54 (see FIG. 6) of the electroacoustic transducer unit 52 of the third exemplary embodiment. The housing 64 includes a rear wall portion 64R disposed on a rear side, and a cylindrical wall portion 64B erected from an outer peripheral portion of the rear wall portion 64R. An attachment portion 64A for attachment to another member is provided on the housing 64. As an example, the attachment portion 64A projects in a flange shape in such a way as to be orthogonal to the front-rear direction from a portion on a front portion side of an outer peripheral surface of the housing 64.

Meanwhile, a second diaphragm 61 to which the electroacoustic transducer unit 62 is attached has a larger area than a first diaphragm 28. A hole 61H is formed to penetrate through the second diaphragm 61. The attachment portion 64A of the housing 64 is disposed on a rear surface 61B side of the second diaphragm 61 and around the hole 61H, and is attached to the second diaphragm 61. The electroacoustic transducer 60 is configured by attaching the electroacoustic transducer unit 62 to the second diaphragm 61. The second diaphragm 61 can radiate a sound to an external space S1 on a front surface 61A side in a case in which a drive unit 16 generates vibration.

Components inside the housing 64 are substantially similar to the components inside the housing 54 (see FIG. 6) of the third exemplary embodiment. Similarly to the third exemplary embodiment, the electroacoustic transducer 60 is configured such that the direction of a front surface 28A of the first diaphragm 28 is matched with the direction of the front surface 61A of the second diaphragm 61, and a sound can be radiated from the front surface 28A of the first diaphragm 28 to the external space S1 on the front surface 61A side of the second diaphragm 61. A first suspension 30 connects an outer peripheral portion of the first diaphragm 28 and the cylindrical wall portion 64B of the housing 64. Accordingly, in the electroacoustic transducer 60, the first diaphragm 28 is connected to the second diaphragm 61 via the first suspension 30 and the housing 64. Similarly to the third exemplary embodiment, the drive unit 16 is disposed on a rear surface 28B side of the first diaphragm 28.

A second suspension 33 connects an outer peripheral portion of a magnetic circuit unit 20 and the cylindrical wall portion 64B of the housing 64. Accordingly, in the electroacoustic transducer 60, the magnetic circuit unit 20 is connected to the second diaphragm 61 via the second suspension 33 and the housing 64.

A port 66 is continuously provided at a part of the cylindrical wall portion 64B of the housing 64. As an example, the port 66 is formed by a through-hole 66H formed at a rear end portion of the cylindrical wall portion 64B of the housing 64 and a duct portion 66D formed continuously with the through-hole 66H. The duct portion 66D is formed in such a way that an internal space of the duct portion 66D extends in the front-rear direction. A rear end portion of the duct portion 66D is a closed portion 66D1, and a front end portion of the duct portion 66D is an outlet 66E of the port 66. As an example, a part of the duct portion 66D is implemented by a part of the cylindrical wall portion 64B.

The port 66 is configured to guide a component of a partial frequency band (more specifically, a sound in an intermediate frequency band between a low-frequency sound and a high-frequency sound) of a sound radiated from the rear surface 28B of the first diaphragm 28 into a cavity S2 on the rear surface 28B side of the first diaphragm 28 (in other words, a sound radiated from the rear surface 28B of the first diaphragm 28 in a direction opposite to a direction in which the front surface 61A of the second diaphragm 61 faces) to the external space S1 on the front surface 61A side of the second diaphragm 61. As the port 66 is provided, the electroacoustic transducer 60 is configured such that a sound pressure of a synthesized sound in the vicinity of a crossover frequency of radiated sounds from the first diaphragm 28 and the second diaphragm 61, in a case in which the drive unit 16 generates vibration is equal to or higher than a sound pressure of the radiated sound from only one of the first diaphragm 28 and the second diaphragm 61 at the crossover frequency.

When viewed from the front surface 61A side of the second diaphragm 61, the first diaphragm 28 and the outlet 66E of the port 66 are disposed inside the hole 61H. Further, the electroacoustic transducer unit 62 in which components including the drive unit 16, the first diaphragm 28, the first suspension 30, the second suspension 33, and the port 66 are unitized is disposed in such a way as not to protrude from the front surface 61A of the second diaphragm 61.

Next, actions and effects of the fourth exemplary embodiment will be described.

In the electroacoustic transducer 60 illustrated in FIG. 11, a sound is radiated from the front surface 61A of the second diaphragm 61, and a sound from the front surface 28A of the first diaphragm 28 and a sound from the outlet 66E of the port 66 are output from the hole 61H of the second diaphragm 61. As a result, substantially similar actions and effects to those of the third exemplary embodiment can be obtained.

In the fourth exemplary embodiment, the electroacoustic transducer 60 can be easily manufactured by attaching the electroacoustic transducer unit 62 in such a way as to be continuous with the hole 61H of the second diaphragm 61, and the electroacoustic transducer unit 62 does not protrude toward the front surface 61A with respect to the second diaphragm 61, so that a simple form can be implemented.

Fifth Exemplary Embodiment

Figure 12:
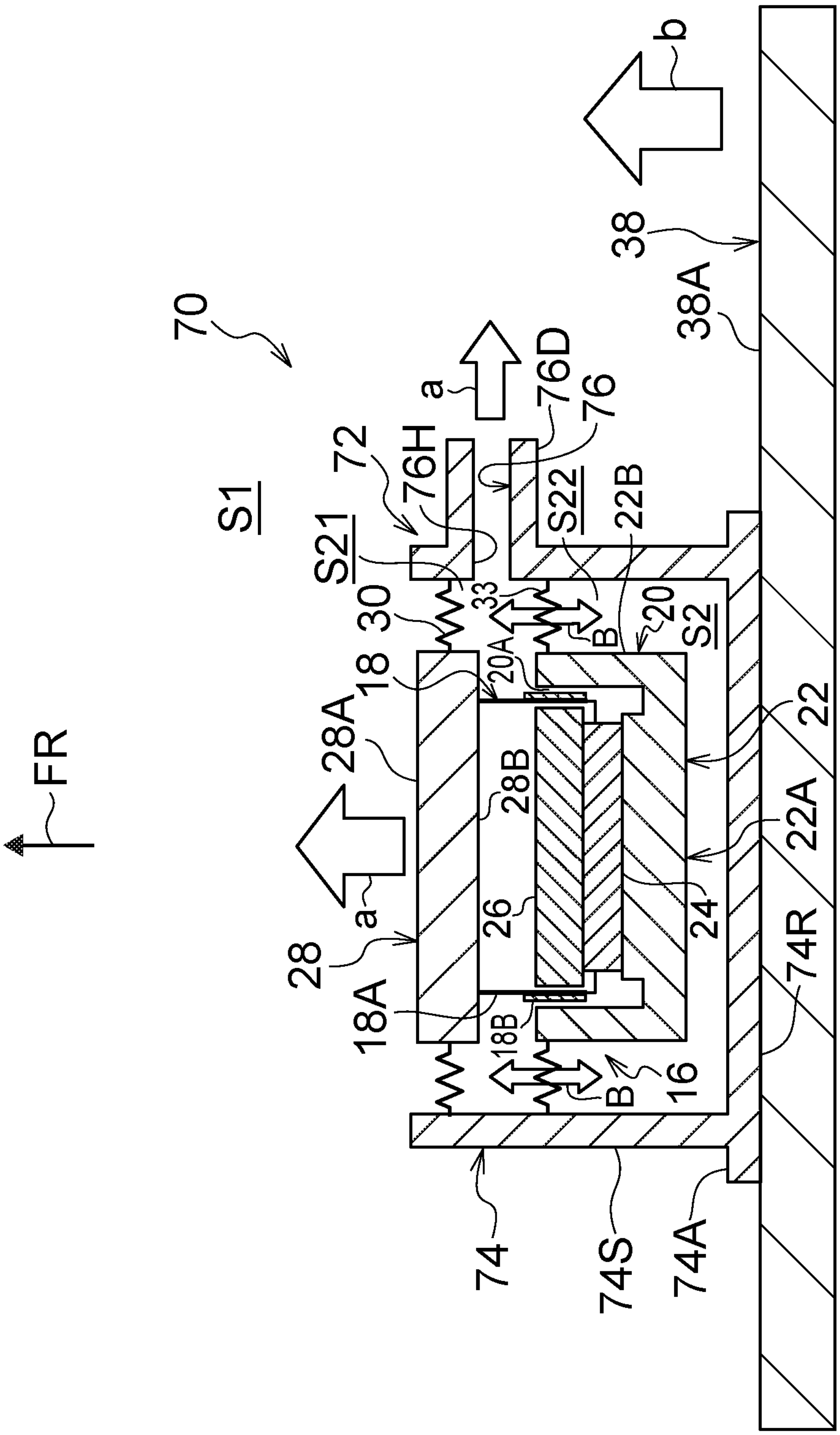
FIG. 12 is a schematic cross-sectional view illustrating an electroacoustic transducer including an electroacoustic transducer unit according to a fifth exemplary embodiment of the present disclosure.

Next, an electroacoustic transducer including an electroacoustic transducer unit according to a fifth exemplary embodiment of the present disclosure will be described with reference to FIG. 12. FIG. 12 is a schematic cross-sectional view of an electroacoustic transducer 70 including an electroacoustic transducer unit 72 according to the fifth exemplary embodiment. As illustrated in FIG. 12, the electroacoustic transducer 70 is different from the electroacoustic transducer 50 in the third exemplary embodiment in that a port 76 is provided instead of the port 56 (see FIG. 6) according to the third exemplary embodiment. Other configurations are substantially similar to those of the third exemplary embodiment. Therefore, components substantially similar to those of the third exemplary embodiment are denoted by the same reference numerals, if appropriate, and a description thereof is omitted.

The electroacoustic transducer unit 72 includes a housing 74 instead of the housing 54 (see FIG. 6) of the electroacoustic transducer unit 52 of the third exemplary embodiment. The housing 74 includes a rear wall portion 74R disposed on a rear side and a cylindrical peripheral wall portion 74S erected from an outer peripheral portion of the rear wall portion 74R. An attachment portion 74A attached to a second diaphragm 38 is provided on the housing 74. The attachment portion 74A is a component similar to the attachment portion 54A (see FIG. 6) of the third exemplary embodiment. The housing 74 has a substantially similar configuration to the housing 54 (see FIG. 6) in the third exemplary embodiment except for the points described below. In FIG. 12, a double-headed arrow B schematically indicates air permeability of a second suspension 33.

A port 76 is continuously provided at a portion on a rear side of a portion to which a first suspension 30 is attached and a portion on a front side of a portion to which the second suspension 33 is attached in the peripheral wall portion 74S of the housing 74. As an example, the port 76 is formed by a through-hole 76H formed in the peripheral wall portion 74S of the housing 74, and a cylindrical duct 76D formed continuously with the through-hole 76H and extending in a direction orthogonal to the front-rear direction.

The port 76 is configured to guide a component of a partial frequency band (more specifically, a sound in an intermediate frequency band between a low-frequency sound and a high-frequency sound) of a sound radiated from a rear surface 28B of a first diaphragm 28 into a cavity S2 on a rear surface 28B side of the first diaphragm 28 (in other words, a sound radiated from the rear surface 28B of the first diaphragm 28 in a direction opposite to a direction in which a front surface 38A of the second diaphragm 38 faces) to the external space S1 on a front surface 38A side of the second diaphragm 38. As the port 76 is provided, the electroacoustic transducer 70 is configured such that a sound pressure of a synthesized sound in the vicinity of a crossover frequency of radiated sounds from the first diaphragm 28 and the second diaphragm 38, in a case in which the drive unit 16 generates vibration is equal to or higher than a sound pressure of the radiated sound from only one of the first diaphragm 28 and the second diaphragm 38 at the crossover frequency.

The configuration of the fifth exemplary embodiment described above can also provide substantially similar actions and effects to those of the third exemplary embodiment described above.

Sixth Exemplary Embodiment

Figure 13:
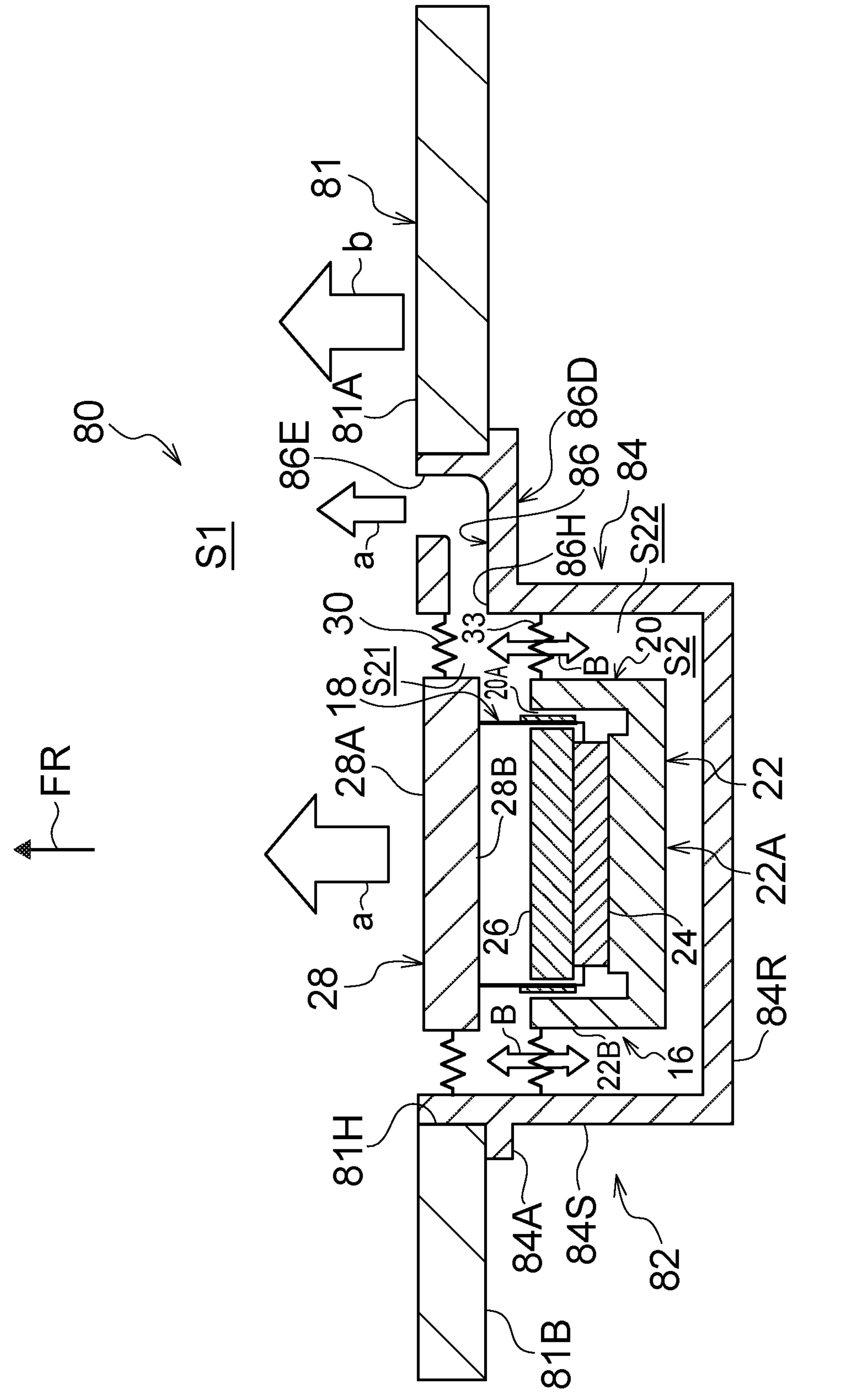
FIG. 13 is a schematic cross-sectional view illustrating an electroacoustic transducer including an electroacoustic transducer unit according to a sixth exemplary embodiment of the present disclosure.

Next, an electroacoustic transducer including an electroacoustic transducer unit according to a sixth exemplary embodiment of the present disclosure will be described with reference to FIG. 13. FIG. 13 is a schematic cross-sectional view of an electroacoustic transducer 80 including an electroacoustic transducer unit 82 according to the sixth exemplary embodiment. As illustrated in FIG. 13, the electroacoustic transducer 80 is different from the electroacoustic transducer 60 in the fourth exemplary embodiment in that a port 86 is provided instead of the port 66 (see FIG. 11) according to the fourth exemplary embodiment. Other configurations are substantially similar to those of the fourth exemplary embodiment. Components substantially similar to those of the fourth exemplary embodiment or the like are denoted by the same reference numerals, if appropriate, and a description thereof is omitted.

A second diaphragm 81 according to the present exemplary embodiment illustrated in FIG. 13 has a substantially similar configuration to the second diaphragm 61 (see FIG. 11) of the fourth exemplary embodiment, except that a hole 81H formed to penetrate through the second diaphragm 81 has a shape slightly different from that of the hole 61H formed to penetrate through the second diaphragm 61 (see FIG. 11) of the fourth exemplary embodiment, and thus is denoted by a different reference numeral.

The electroacoustic transducer unit 82 of the exemplary embodiment includes a housing 84 (see FIG. 11) instead of the housing 64 of the electroacoustic transducer unit 62 of the fourth exemplary embodiment. The housing 84 includes a rear wall portion 84R disposed on a rear side and a cylindrical peripheral wall portion 84S erected from an outer peripheral portion of the rear wall portion 84R. The peripheral wall portion 84S is a component substantially similar to the cylindrical wall portion 64B (see FIG. 11) of the fourth exemplary embodiment. An attachment portion 84A attached to a rear surface 81B side of the second diaphragm 81 and around the hole 81H is provided on the housing 84. The housing 84 has a substantially similar configuration to the housing 64 (see FIG. 11) in the fourth exemplary embodiment except for the points described below.

The port 86 is continuously provided at a portion on a rear side of a portion to which a first suspension 30 is attached and a portion on a front side of a portion to which a second suspension 33 is attached in the peripheral wall portion 84S of the housing 84. As an example, the port 86 is formed by a through-hole 86H formed in the peripheral wall portion 84S of the housing 84 and a cylindrical duct 86D formed continuously with the through-hole 86H. The duct 86D extends from the through-hole 86H in a direction orthogonal to the front-rear direction, and a distal end portion of the duct 86D in the extension direction is closed and a front portion on a distal end portion side in the extension direction is an outlet 86E of the port 86.

The port 86 is configured to guide a component of a partial frequency band (more specifically, a sound in an intermediate frequency band between a low-frequency sound and a high-frequency sound) of a sound radiated from a rear surface 28B of a first diaphragm 28 into a cavity S2 on a rear surface 28B side of the first diaphragm 28 (in other words, a sound radiated from the rear surface 28B of the first diaphragm 28 in a direction opposite to a direction in which a front surface 81A of the second diaphragm 81 faces) to an external space S1 on a front surface 81A side of the second diaphragm 81. As the port 86 is provided, the electroacoustic transducer 80 is configured such that a sound pressure of a synthesized sound in the vicinity of a crossover frequency of radiated sounds from the first diaphragm 28 and the second diaphragm 81, in a case in which a drive unit 16 generates vibration is equal to or higher than a sound pressure of the radiated sound from only one of the first diaphragm 28 and the second diaphragm 81 at the crossover frequency.

When viewed from the front surface 81A side of the second diaphragm 81, the first diaphragm 28 and the outlet 86E of the port 86 are disposed inside the hole 81H of the second diaphragm 81. Further, the electroacoustic transducer unit 82 in which components including the drive unit 16, the first diaphragm 28, the first suspension 30, the second suspension 33, and the port 86 are unitized is disposed in such a way as not to protrude from the front surface 81A of the second diaphragm 81.

The configuration of the sixth exemplary embodiment described above can also provide substantially similar actions and effects to those of the fourth exemplary embodiment described above.

Seventh Exemplary Embodiment

Figure 14:
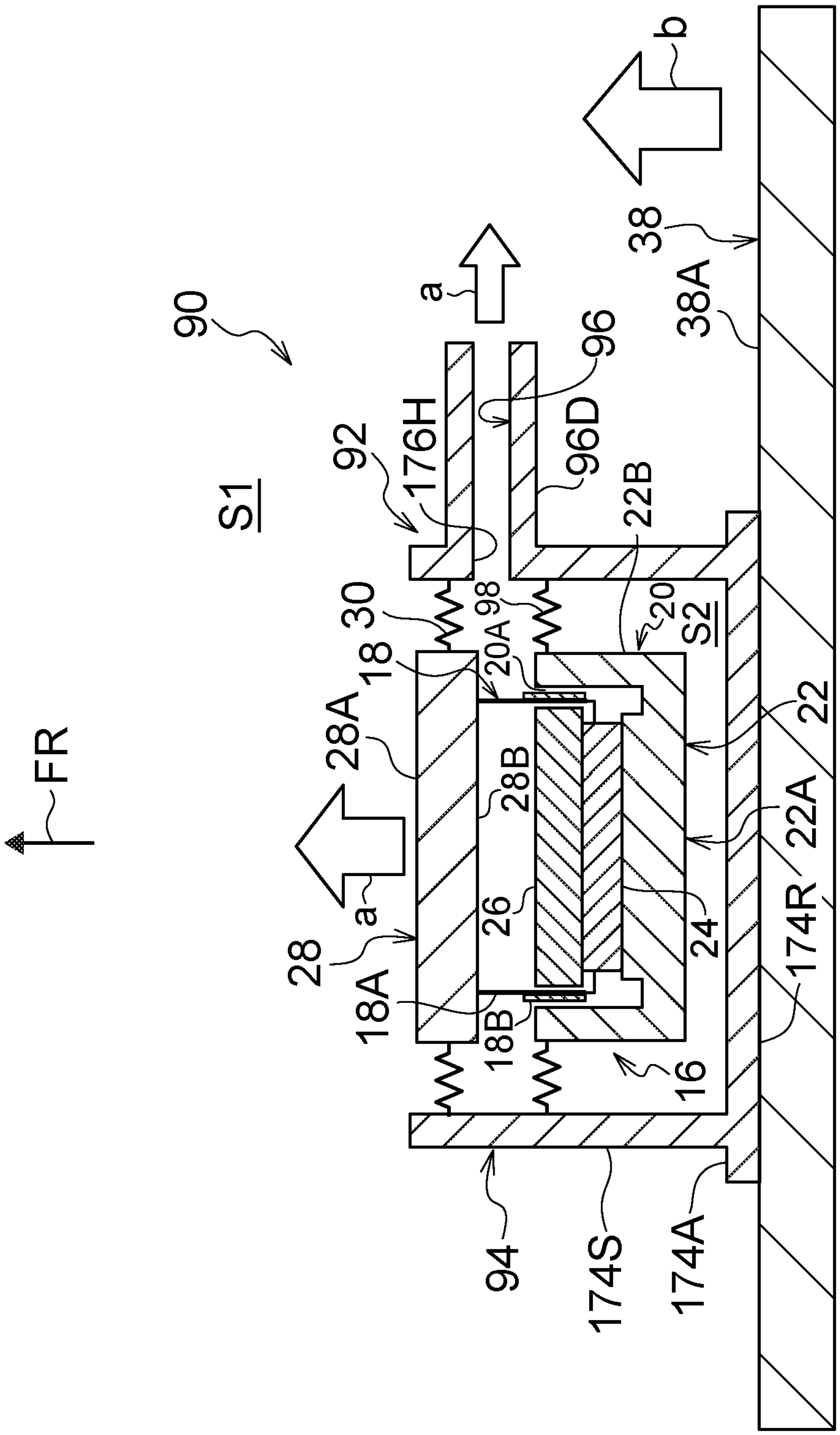
FIG. 14 is a schematic cross-sectional view illustrating an electroacoustic transducer including an electroacoustic transducer unit according to a seventh exemplary embodiment of the present disclosure.

Next, an electroacoustic transducer including an electroacoustic transducer unit according to a seventh exemplary embodiment of the present disclosure will be described with reference to FIG. 14. FIG. 14 is a schematic cross-sectional view of an electroacoustic transducer 90 including an electroacoustic transducer unit 92 according to the seventh exemplary embodiment. As illustrated in FIG. 14, the electroacoustic transducer 90 is different from the electroacoustic transducer 70 according to the fifth exemplary embodiment in that a second suspension 98 is provided instead of the second suspension 33 (see FIG. 12) of the fifth exemplary embodiment, and a port 96 is provided instead of the port 76 (see FIG. 12) of the fifth exemplary embodiment. Other configurations are substantially similar to those of the fifth exemplary embodiment. Components substantially similar to those of the fifth exemplary embodiment or the like are denoted by the same reference numerals, if appropriate, and a description thereof is omitted.

The second suspension 98 of the electroacoustic transducer unit 92 is substantially similar to the second suspension 33 of the fifth exemplary embodiment (see FIG. 12) except that the second suspension 98 does not have air permeability. The second suspension 98 has coating for blocking as an example in order to block air permeating in the front-rear direction. A housing 94 of the electroacoustic transducer unit 92 has a similar configuration to the housing 74 of the fifth exemplary embodiment except that the port 96 is provided instead of the port 76 (see FIG. 12) of the housing 74 of the fifth exemplary embodiment. Therefore, components of the housing 94 that are similar to those of the housing 74 (see FIG. 12) of the fifth exemplary embodiment are denoted by reference numerals obtained by adding "1" to the heads of the reference numerals of the corresponding components (specifically, the rear wall portion 74R, the peripheral wall portion 74S, the attachment portion 74A, and the through-hole 76H) of the housing 74 in the drawing, and a description thereof is omitted.

The port 96 is formed by a through-hole 176H formed in a peripheral wall portion 174S of the housing 94, and a cylindrical duct 96D formed continuously with the through-hole 176H and extending in a direction orthogonal to the front-rear direction. The port 96 has a configuration similar to that of the port 76 of the fifth exemplary embodiment except that the length of the port 96 is set in such a way as to obtain an effect substantially similar to that of the fifth exemplary embodiment, and the port 96 has a length larger than that of the port 76 of the fifth exemplary embodiment. As the port 96 is provided, the electroacoustic transducer 90 is configured such that a sound pressure of a synthesized sound in the vicinity of a crossover frequency of radiated sounds from a first diaphragm 28 and a second diaphragm 38, in a case in which a drive unit 16 generates vibration is equal to or higher than a sound pressure of the radiated sound from only one of the first diaphragm 28 and the second diaphragm 38 at the crossover frequency.

Here, the configuration of the present exemplary embodiment will be supplementary described. As in the exemplary embodiment, in a case in which the second suspension 98 has no air permeability, the port 96 needs to be provided in such a way as to communicate with an internal space between a first suspension 30 and the second suspension 98. In such a configuration, the volume of a cavity adjacent to the port is reduced as compared with a case where the second suspension 33 (see FIG. 12) has air permeability as in the fifth exemplary embodiment. Meanwhile, an air spring hardness is $K \propto Dp^4/V$, and a port mass is $M \propto Dp^2 \times l$ p, in which the volume of the cavity adjacent to the port is V, a cross-sectional diameter of the port (in the case of a circular shape) is Dp, and the port length is 1 p. A resonance frequency $f_0$ of a sound from the port is obtained by the following 1.

$$f_0 = \frac{1}{2\pi} \cdot \sqrt{\frac{K}{M}} \propto \frac{Dp}{\sqrt{V \times lp}} \quad \text{[Formula 1]}$$

For this reason, in the configuration in which the second suspension has no air permeability, the air spring of the cavity adjacent to the port becomes hard, and the resonance frequency of the sound from the port tends to be high, as compared with the configuration in which the second suspension has air permeability. Therefore, it is necessary to decrease a passage cross-sectional area of the port, increase the length of the port, or decrease the passage cross-sectional area of the port to increase the length of the port as compared with a case where the second suspension has air permeability, in order to set the resonance frequency to a desired frequency. From this point of view, in the seventh exemplary embodiment, the port 96 is set to be longer than the port 76 (see FIG. 12) in the fifth exemplary embodiment as described above.

The configuration of the seventh exemplary embodiment described above can also provide substantially similar actions and effects to those of the fifth exemplary embodiment described above.

As a modification of the seventh exemplary embodiment, a port having a smaller passage cross-sectional area than the port 76 (see FIG. 12) of the fifth exemplary embodiment may be provided, or a port having a smaller passage cross-sectional area and a larger length than the port 76 (see FIG. 12) of the fifth exemplary embodiment may be provided.

Eighth Exemplary Embodiment

Figure 15:
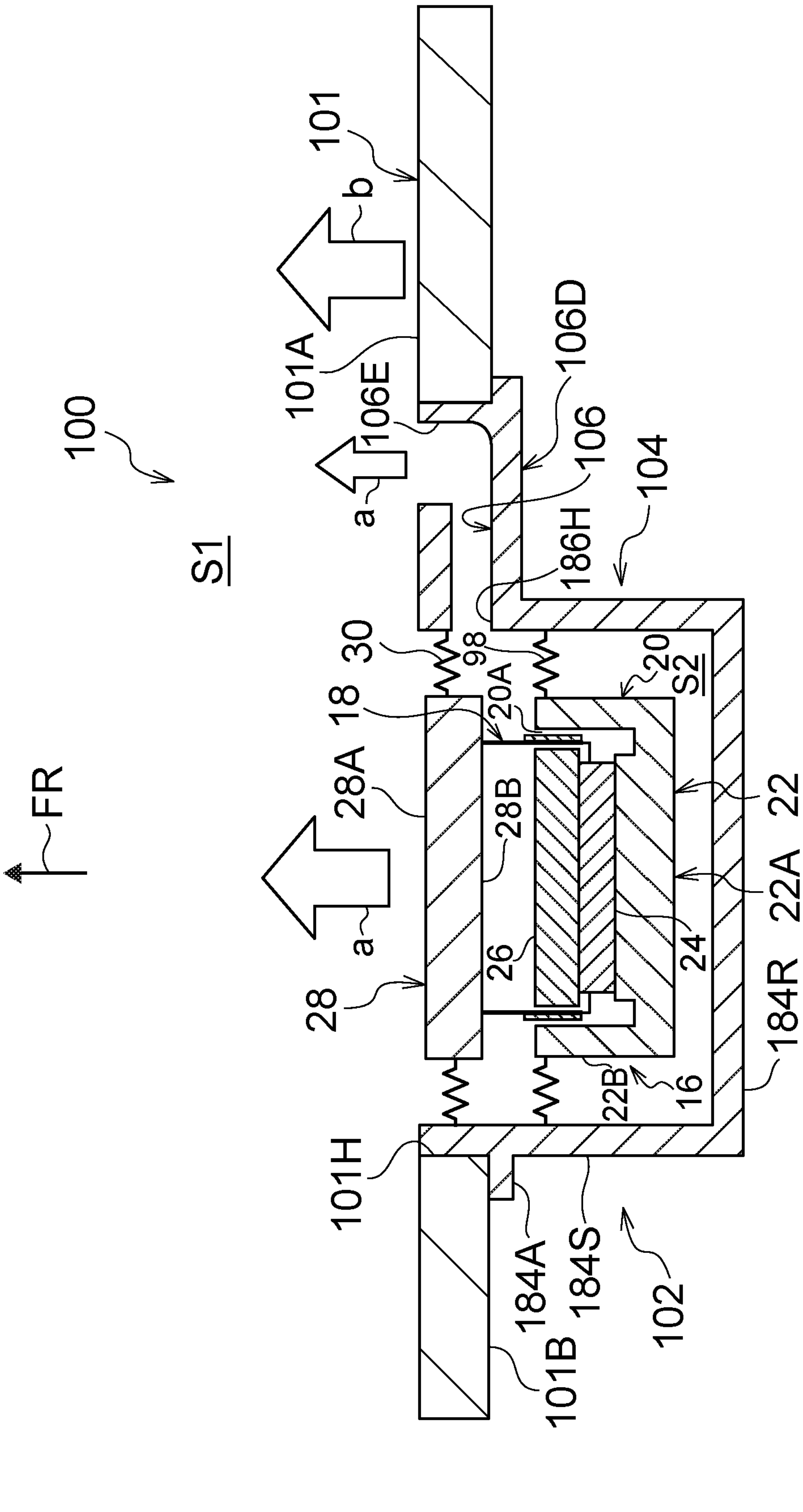
FIG. 15 is a schematic cross-sectional view illustrating an electroacoustic transducer including an electroacoustic transducer unit according to an eighth exemplary embodiment of the present disclosure.

Next, an electroacoustic transducer including an electroacoustic transducer unit according to an eighth exemplary embodiment of the present disclosure will be described with reference to FIG. 15. FIG. 15 is a schematic cross-sectional view of an electroacoustic transducer 100 including an electroacoustic transducer unit 102 according to the eighth exemplary embodiment. As illustrated in FIG. 15, the electroacoustic transducer 100 is different from the electroacoustic transducer 80 according to the sixth exemplary embodiment in that a second suspension 98 of the seventh exemplary embodiment is provided instead of the second suspension 33 (see FIG. 13) of the sixth exemplary embodiment, and a port 106 is provided instead of the port 86 (see FIG. 13) of the sixth exemplary embodiment. Other configurations are substantially similar to those of the sixth exemplary embodiment. Components substantially similar to those of the sixth exemplary embodiment or the like are denoted by the same reference numerals, if appropriate, and a description thereof is omitted.

A second diaphragm 101 according to the present exemplary embodiment illustrated in FIG. 15 has a substantially similar configuration to the second diaphragm 81 (see FIG. 13) of the sixth exemplary embodiment, except that a hole 101H formed to penetrate through the second diaphragm 101 has a shape slightly different from that of the hole 81H formed to penetrate through the second diaphragm 81 (see FIG. 13) of the sixth exemplary embodiment, and thus is denoted by a different reference numeral. Further, Reference Numeral 101A denotes a front surface of the second diaphragm 101, and Reference Numeral 101B denotes a rear surface of the second diaphragm 101.

A housing 104 of the electroacoustic transducer unit 102 has a similar configuration to the housing 84 of the sixth exemplary embodiment except that the port 106 is provided instead of the port 86 (see FIG. 13) of the housing 84 of the sixth exemplary embodiment. Therefore, components of the housing 104 that are similar to those of the housing 84 (see FIG. 13) of the sixth exemplary embodiment are denoted by reference numerals obtained by adding "1" to the heads of the reference numerals of the corresponding components (specifically, the rear wall portion 84R, the peripheral wall portion 84S, the attachment portion 84A, and the through-hole 86H) of the housing 84 in the drawing, and a description thereof is omitted.

The port 106 is formed by a through-hole 186H formed in a peripheral wall portion 184S of the housing 104 and a duct 106D formed continuously with the through-hole 186H. The duct 106D extends from the through-hole 186H in a direction orthogonal to the front-rear direction, and a distal end portion of the duct 106D in the extension direction is closed and a front portion on a distal end portion side in the extension direction is an outlet 106E of the port 106. The port 106 has a configuration similar to that of the port 86 of the sixth exemplary embodiment, except that the length of the port 106 is set in such a way as to obtain an effect substantially similar to that of the sixth exemplary embodiment, and the port 106 has a length larger than that of the port 86 (see FIG. 13) of the sixth exemplary embodiment. As the port 106 is provided, the electroacoustic transducer 100 is configured such that a sound pressure of a synthesized sound in the vicinity of a crossover frequency of radiated sounds from a first diaphragm 28 and the second diaphragm 101, in a case in which a drive unit 16 generates vibration is equal to or higher than a sound pressure of the radiated sound from only one of the first diaphragm 28 and the second diaphragm 101 at the crossover frequency.

The configuration of the eighth exemplary embodiment described above can also provide substantially similar actions and effects to those of the sixth exemplary embodiment described above.

As a modification of the eighth exemplary embodiment, a port having a smaller passage cross-sectional area than the port 86 (see FIG. 13) of the sixth exemplary embodiment may be provided, or a port having a smaller passage cross-sectional area and a larger length than the port 86 (see FIG. 13) of the sixth exemplary embodiment may be provided.

Ninth Exemplary Embodiment

Next, an electroacoustic transducer including an electroacoustic transducer unit according to the ninth exemplary embodiment of the present disclosure will be described with reference to FIG. 16. FIG. 16 is a partially cut-away perspective view of an electroacoustic transducer 110 including an electroacoustic transducer unit 112 according to the ninth exemplary embodiment. As illustrated in FIG. 16, the electroacoustic transducer 110 according to the ninth exemplary embodiment is different from the electroacoustic transducer 50 (see FIG. 6) of the third exemplary embodiment in that two first suspensions 120 and 122 and two second suspensions 124 and 126 (a plurality of first suspensions and a plurality of second suspensions in a broad sense) are provided instead of one first suspension and one second suspension. Other configurations are substantially similar to those of the third exemplary embodiment. Components substantially similar to those of the third exemplary embodiment are denoted by the same reference numerals, if appropriate, and a description thereof is omitted.

A first diaphragm 28 is formed in an annular shape in front view, and has a conical shape in which a front surface is gradually recessed toward a central portion side. A dome-shaped center cap 27 is joined to the central portion side of a front surface of the first diaphragm 28. The first first-suspension 120 made of an elastic material such as rubber is joined to an outer peripheral portion 28D of the first diaphragm 28 over the entire circumference. The first first-suspension 120 is referred to as an edge, is formed in an annular shape in front view, and is joined to an annular attachment portion 54B on a front end portion side of a housing 54 over the entire circumference.

As an example, the housing 54 includes a frame 54X forming a front portion and a middle portion of the housing 54 in the front-rear direction, and a case 54Y attached to a rear end portion of the frame 54X and forming a rear portion of the housing 54. A shelf-shaped portion 54Z extending inward in a radial direction of the frame 54X is formed at a rear end portion of the frame 54X. An outer peripheral surface of a cylindrical inner cylinder member 55 is fixed to an inner peripheral surface of the middle portion of the housing 54 in the front-rear direction in a state of being in contact with the entire circumference. Furthermore, a front surface of the shelf-shaped portion 54Z and a rear end surface of the inner cylinder member 55 are slightly separated in the front-rear direction.

Meanwhile, a short cylindrical inner peripheral end portion 28C bent rearward is provided at a central portion of the first diaphragm 28. The inner peripheral end portion 28C is joined to an outer peripheral portion on a front end portion side of a voice coil bobbin 18A. An inner peripheral portion of the second first-suspension 122 is joined to the inner peripheral end portion 28C of the first diaphragm 28. The second first-suspension 122 is a member substantially similar to the spider 34 illustrated in FIG. 10 although the shape is slightly different. As illustrated in FIG. 16, a short cylindrical peripheral wall portion 122A bent rearward and a flange portion 122B projecting in a flange shape from a rear end of the peripheral wall portion 122A are formed on an outer peripheral portion side of the second first-suspension 122. The flange portion 122B of the second first-suspension 122 is connected to a portion on an inner peripheral side of the housing 54 via another member (specifically, the first second-suspension 124 to be described later and the inner cylinder member 55 described above).

As described above, the first first-suspension 120 and the second first-suspension 122 are disposed at an interval in the front-rear direction (a vibration direction of the first diaphragm 28 and a voice coil unit 18). The first diaphragm 28 is connected to a second diaphragm 38 via the first first-suspension 120 and the housing 54, and is connected to the second diaphragm 38 via a plurality of members including the second first-suspension 122 and the housing 54.

An inner peripheral portion of the first second-suspension 124 is joined to a front end surface portion of a cylindrical portion 22B of a yoke 22 over the entire circumference. The first second-suspension 124 is formed in an annular shape in front view, has a communication hole 124H as a communication portion formed to penetrate through the first second-suspension 124, and is a member substantially similar to the second suspension 33 illustrated in FIG. 7. As illustrated in FIG. 16, a rear surface of an outer peripheral portion of the first second-suspension 124 is joined to a front surface of the inner cylinder member 55. That is, the outer peripheral portion of the first second-suspension 124 is connected to a portion on the inner peripheral side of the housing 54 via the inner cylinder member 55. The flange portion 122B of the second first-suspension 122 overlaps with and is joined to a front surface of the outer peripheral portion of the first second-suspension 124.

An inner peripheral portion of the second second-suspension 126 is joined to an outer peripheral portion of a rear surface of the yoke 22 over the entire circumference. The second second-suspension 126 is formed in an annular shape in front view, has a communication hole 126H as a communication portion formed to penetrate through the second second-suspension 126, and is a member substantially similar to the first second-suspension 124. An outer peripheral portion of the second second-suspension 126 is disposed between a rear surface of the inner cylinder member 55 and the front surface of the shelf-shaped portion 54Z of the housing 54 and is joined to the housing 54.

As described above, the first second-suspension 124 and the second second-suspension 126 are disposed at an interval in the front-rear direction (a vibration direction of a magnetic circuit unit 20). The magnetic circuit unit 20 is connected to the second diaphragm 38 via the first second-suspension 124, the inner cylinder member 55, and the housing 54, and is connected to the second diaphragm 38 via the second second-suspension 126 and the housing 54.

According to the configuration of the ninth exemplary embodiment described above, it is also possible to reproduce a high-quality sound by suppressing a decrease in sound pressure in an intermediate frequency band between a low-frequency sound and a high-frequency sound by substantially similar actions to those of the third exemplary embodiment described above while achieving size reduction.

In the ninth exemplary embodiment, the first first-suspension 120 and the second first-suspension 122 are provided at an interval in the vibration direction of the first diaphragm 28 and the voice coil unit 18, so that the first diaphragm 28 and the voice coil unit 18 can vibrate in the front-rear direction basically without rolling (swinging). Since the first second-suspension 124 and the second second-suspension 126 are provided at an interval in the vibration direction of the magnetic circuit unit 20, the magnetic circuit unit 20 can basically vibrate in the front-rear direction without rolling. In this way, as rolling of the first diaphragm 28, the voice coil unit 18, and the magnetic circuit unit 20 is suppressed, it is possible to prevent or effectively suppress a portion of the voice coil unit 18 disposed in a magnetic gap 20A of the magnetic circuit unit 20 from coming into contact with the magnetic circuit unit 20.

For example, there may be a case where a plurality of first suspensions and a plurality of second suspensions cannot be provided due to space restrictions or the like, such as a case where the length of the electroacoustic transducer unit in the front-rear direction needs to be decreased. In such a case, the voice coil unit (18) and the magnetic circuit unit (20) are assumed to roll, and it is sufficient if the width of the magnetic gap (20A) of the magnetic circuit unit (20) is set large so that a portion of the voice coil unit (18) disposed in the magnetic gap (20A) of the magnetic circuit unit (20) does not come into contact with the magnetic circuit unit (20) even when the assumed rolling occurs. However, in this case, it is disadvantageous in terms of a driving force.

Tenth Exemplary Embodiment

Figure 17:
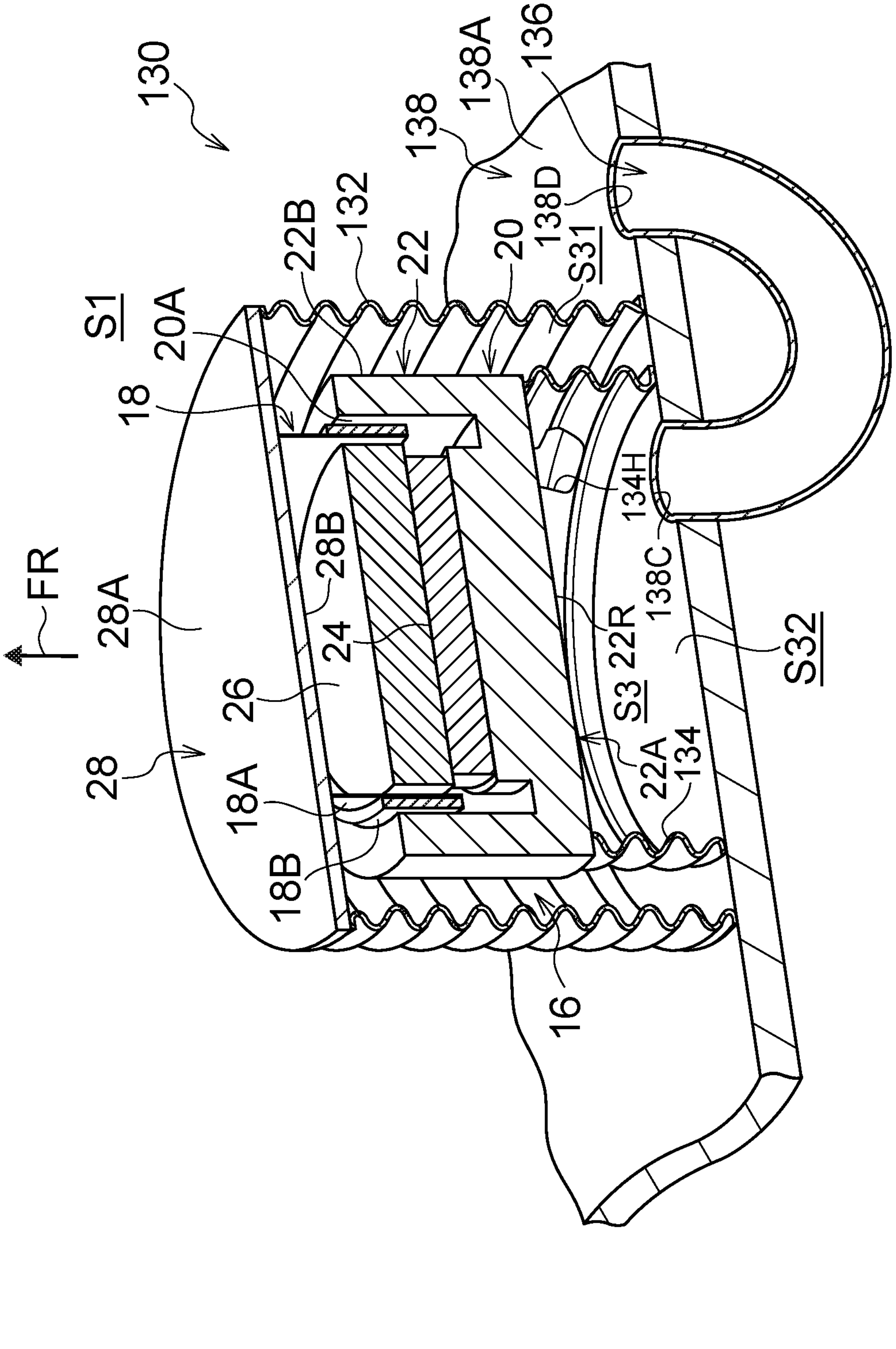
FIG. 17 is a partially cut-away perspective view illustrating an electroacoustic transducer according to a tenth exemplary embodiment of the present disclosure.

Next, an electroacoustic transducer according to a tenth exemplary embodiment of the present disclosure will be described with reference to FIG. 17. FIG. 17 is a partially cut-away perspective view illustrating an electroacoustic transducer 130 according to the tenth exemplary embodiment. The electroacoustic transducer 130 according to the tenth exemplary embodiment includes substantially similar components to the drive unit 16 and the first diaphragm 28 (see FIG. 6) in the electroacoustic transducer 50 according to the third exemplary embodiment. In the tenth exemplary embodiment, components substantially similar to those of the electroacoustic transducer 50 (see FIG. 6) of the third exemplary embodiment are denoted by the same reference numerals, and a description thereof is omitted.

As illustrated in FIG. 17, a first suspension 132 is disposed on a rear surface 28B side of a first diaphragm 28. The first suspension 132 is formed in a cylindrical shape and a bellows shape, and is disposed in such a way that the cylinder axis direction is the front-rear direction. An opening end portion of the first suspension 132 on one side in the cylinder axis direction is joined to an outer peripheral portion of a rear surface 28B of the first diaphragm 28. An opening end portion of the first suspension 132 on the other side in the cylinder axis direction is joined to a front surface 138A of a second diaphragm 138. That is, the first diaphragm 28 is connected to the second diaphragm 138 via the first suspension 132.

A drive unit 16 is disposed inside the first suspension 132. A second suspension 134 is disposed on a rear side of the drive unit 16. The second suspension 134 is formed in a cylindrical shape and a bellows shape, and has a smaller diameter and a smaller length in the cylinder axis direction than the first suspension 132. The second suspension 134 is disposed in such a way that the cylinder axis direction is the front-rear direction, and the center axis (not illustrated) of the second suspension 134 is aligned with that of the first suspension 132. An opening end portion of the second suspension 134 on one side in the cylinder axis direction is joined to an outer peripheral portion of a rear surface 22R of a yoke 22. An opening end portion of the second suspension 134 on the other side in the cylinder axis direction is joined to the front surface 138A of the second diaphragm 138. That is, a magnetic circuit unit 20 is connected to the second diaphragm 138 via the second suspension 134.

A communication hole 134H for allowing a space on an inner side of the second suspension 134 and a space on an outer side of the second suspension 134 to communicate with each other is formed to penetrate through the second suspension 134. The communication hole 134H allows two spaces S31 and S32 partitioned by the second suspension 134 to communicate with each other in a cavity S3 on a rear surface 28B side of the first diaphragm 28. A plurality of communication holes 134H are formed in such a way as to be arranged in a circumferential direction of the second suspension 134.

The second diaphragm 138 has a larger area than the first diaphragm 28, and can radiate a sound to an external space S1 on a front surface 138A side in a case in which the drive unit 16 generates vibration. In the second diaphragm 138, a first hole 138C is formed to penetrate through a portion inside the second suspension 134 in front view, and a second hole 138D is formed to penetrate through a portion outside the first suspension 132 in front view. One end portion of a port 136 is connected to the first hole 138C, and the other end portion of the port 136 is connected to the second hole 138D. The port 136 is bent in a substantially C shape.

The port 136 is configured to guide a component of a partial frequency band (more specifically, a sound in an intermediate frequency band between a low-frequency sound and a high-frequency sound) of a sound radiated from the rear surface 28B of the first diaphragm 28 into the cavity S3 on the rear surface 28B side of the first diaphragm 28 (in other words, a sound radiated from the rear surface 28B of the first diaphragm 28 in a direction opposite to a direction in which the front surface 138A of the second diaphragm 138 faces) to the external space S1 on the front surface 138A side of the second diaphragm 138. As the port 136 is provided, the electroacoustic transducer 130 is configured such that a sound pressure of a synthesized sound in the vicinity of a crossover frequency of radiated sounds from the first diaphragm 28 and the second diaphragm 138, in a case in which the drive unit 16 generates vibration is equal to or higher than a sound pressure of the radiated sound from only one of the first diaphragm 28 and the second diaphragm 138 at the crossover frequency.

According to the configuration of the tenth exemplary embodiment described above, it is also possible to reproduce a high-quality sound by suppressing a decrease in sound pressure in an intermediate frequency band between a low-frequency sound and a high-frequency sound by substantially similar actions to those of the third exemplary embodiment described above while achieving size reduction.

As a modification of the tenth exemplary embodiment, a configuration in which, instead of the first hole (138C) in the second diaphragm (138), the first hole is formed to penetrate through a portion of the second diaphragm (138) outside the second suspension (134) and inside the first suspension (132) in front view, and the first hole and the second hole (138D) are connected by a port, can also be adopted. Furthermore, as a further modification of such a modification, a configuration in which the communication hole (134H) is not provided in the second suspension (134) may be adopted. In these modifications, it goes without saying that the dimension of the port is set in such a way as to obtain substantially similar effects to those of the tenth exemplary embodiment.

Eleventh Exemplary Embodiment

Figure 18:
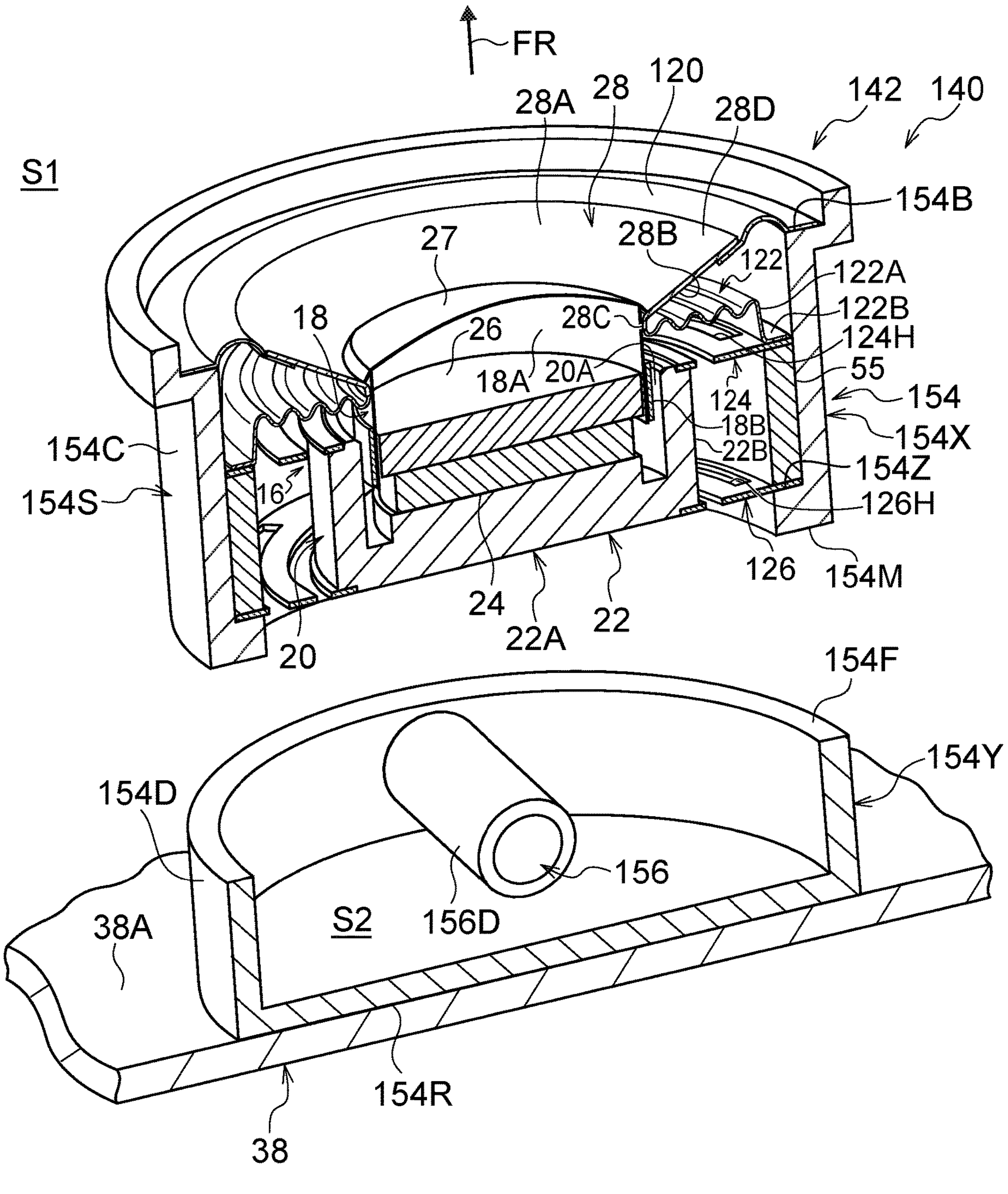
FIG. 18 is a partially cut-away exploded perspective view illustrating an electroacoustic transducer according to an eleventh exemplary embodiment of the present disclosure in a state where the electroacoustic transducer is divided into two portions, a front portion and a rear portion.

Next, an electroacoustic transducer according to an eleventh exemplary embodiment of the present disclosure will be described with reference to FIG. 18. FIG. 18 is a partially cut-away exploded perspective view illustrating an electroacoustic transducer 140 according to the eleventh exemplary embodiment in a state where the electroacoustic transducer 140 is divided into two portions, a front portion and a rear portion. As illustrated in FIG. 18, the electroacoustic transducer 140 of the eleventh exemplary embodiment is different from the electroacoustic transducer 110 (see FIG. 16) of the ninth exemplary embodiment in that, a driver unit 142 that does not include a port 156 is attached to a case 154Y in a state where the case 154Y in which the port 156 is provided, is attached to a second diaphragm 38 in advance. The other configuration is substantially similar to that of the ninth exemplary embodiment except that the port 156 is included instead of the port 56 (see FIG. 16) of the ninth exemplary embodiment and that a rear wall portion 154R is attached to the second diaphragm 38 without including the attachment portion 54A (see FIG. 16) of the ninth exemplary embodiment. Components substantially similar to those of the ninth exemplary embodiment are denoted by the same reference numerals, if appropriate, and a description thereof is omitted.

The driver unit 142 has a configuration substantially similar to a he configuration in which the case 54Y is removed from the electroacoustic transducer unit 112 of the ninth exemplary embodiment illustrated in FIG. 16. A frame 154X of the driver unit 142 illustrated in FIG. 18 has a configuration substantially similar to the frame 54X (see FIG. 16) of the ninth exemplary embodiment, but is denoted by a different reference numeral from the frame 54X of the ninth exemplary embodiment for convenience. An annular attachment portion 154B in the frame 154X is a component similar to the annular attachment portion 54B (see FIG. 16) of the ninth exemplary embodiment, and a shelf-shaped portion 154Z in the frame 154X is a component similar to the shelf-shaped portion 54Z (see FIG. 16) of the ninth exemplary embodiment. In addition, a cylindrical peripheral wall portion 154C in the frame 154X is a component similar to a portion of the peripheral wall portion 54S of the housing 54 of the ninth exemplary embodiment illustrated in FIG. 16 that is implemented by the frame 54X. As illustrated in FIG. 18, a rear end surface 154M of the peripheral wall portion 154C is a portion attached to a front end surface 154F of the case 154Y.

The case 154Y includes a rear wall portion 154R disposed on a rear side, and a cylindrical peripheral wall portion 154D erected from an outer peripheral portion of the rear wall portion 154R. The peripheral wall portion 154D is a component substantially similar to a portion of the peripheral wall portion 54S of the housing 54 of the ninth exemplary embodiment illustrated in FIG. 16 that is implemented by the case 54Y. In other words, the peripheral wall portion 154D of the case 154Y illustrated in FIG. 18 and the peripheral wall portion 154C of the frame 154X constitute a peripheral wall portion 154S extending in the front-rear direction. A cavity S2 is formed on a rear surface 28B side of a first diaphragm 28 by a container 154 including the frame 154X and the case 154Y. In FIG. 18, for convenience, Reference Numeral 154 indicating the container is illustrated on a frame 154X side, and Reference Numeral S2 indicating the cavity is illustrated on an inner side of the peripheral wall portion 154D of the case 154Y.

A port 156 is continuously provided at the peripheral wall portion 154D of the case 154Y. As an example, the port 156 is formed by a cylindrical duct 156D extending from the peripheral wall portion 154D toward the inside of the peripheral wall portion 154D in a direction orthogonal to the front-rear direction, and a through-hole (not illustrated) formed in the peripheral wall portion 154D in such a way as to be continuous with an inner space of the duct 156D.

The port 156 is configured to guide a component of a partial frequency band of a sound radiated from the rear surface 28B of the first diaphragm 28 into the cavity S2 on the rear surface 28B side of the first diaphragm 28 (in other words, a sound radiated from the rear surface 28B of the first diaphragm 28 in a direction opposite to a direction in which a front surface 38A of the second diaphragm 38 faces) to an external space S1 on the front surface 38A side of the second diaphragm 38. As the port 156 is provided, the electroacoustic transducer 140 is configured such that a sound pressure of a synthesized sound in the vicinity of a crossover frequency of radiated sounds from the first diaphragm 28 and the second diaphragm 38 in a case in which a drive unit 16 generates vibration is equal to or higher than a sound pressure of the radiated sound from only one of the first diaphragm 28 and the second diaphragm 38 at the crossover frequency.

The actions and effects substantially similar to those of the ninth exemplary embodiment can also be obtained by the eleventh exemplary embodiment described above.

[Supplementary Description of Exemplary Embodiments]

In the first to eleventh exemplary embodiments illustrated in FIGS. 1 to 18, the magnetic circuit unit 20 is an internal magnetic circuit unit, and such a configuration is preferable from the viewpoint of size reduction of the drive unit 16, but a configuration in which the magnetic circuit unit is an external magnetic circuit unit can also be adopted.

As a modification of the first to eleventh exemplary embodiments, a configuration in which the magnetic circuit unit (20) as the action portion has a smaller mass than the voice coil unit (18) as the reaction portion, the first diaphragm (28) is connected to the magnetic circuit unit (20), and the voice coil unit (18) is connected to the second diaphragm (38, 41, 61, 81, 101, or 138) via at least the second suspension (32, 33, 98, 124, 126, or 134) can also be adopted.

In the first to eleventh exemplary embodiments, a configuration in which the drive unit 16 includes the magnetic circuit unit 20 as the action portion and the voice coil unit 18 as the reaction portion and uses the Lorentz force has been described as an example. However, as a modification of the exemplary embodiments, the drive unit may be a drive unit having a configuration other than the configuration using the Lorentz force, such as a known linear actuator that includes two mass bodies of an action portion and a reaction portion and is capable of generating vibration. The linear actuator including two mass bodies of an action portion and a reaction portion is known in, for example, Japanese Patent Application Laid-Open (JP-A) No. 2003-235232, or the like, and thus a detailed description thereof will be omitted.

As for a drive unit having a configuration other than the configuration disclosed in JP-A No. 2003-235232, a speaker including a drive unit capable of generating vibration by including two mass bodies of an action portion and a reaction portion without using the Lorentz force is known in, for example, Japanese Patent No. 3749662, and the drive unit disclosed in the same publication can also be applied to the drive unit of the present disclosure. Although the Lorentz force is used, a drive unit having a configuration different from that of the drive unit 16 of the first to tenth exemplary embodiments is known in, for example, Japanese Patent No. 2936009 (an example of a moving magnet type), Japanese Utility Model Application Publication (JP-Y) No. S61-45745 (an example in which the magnetic circuit unit is divided into an action portion and a reaction portion), and Japanese Patent Application Laid-Open (JP-A) No. H10-285689 (an example in which when a current is supplied to a drive coil, a secondary current is induced in a secondary coil to generate a driving force), and the drive units disclosed in these publications can also be applied to the drive unit of the present disclosure.

As a modification of the first, third, fifth, seventh, and ninth exemplary embodiments, for example, a configuration in which the housing of the electroacoustic transducer unit does not include any component corresponding to the rear wall portions 14R, 54R, 74R, and 174R and any component corresponding to the flange-shaped attachment portions 14A, 54A, 74A, and 174A illustrated in FIGS. 1, 6, 12, 14, and 16, and a portion corresponding to the rear end portion of the peripheral wall portion 14S, 54S, 74S, or 174S is used as an attachment portion for attachment to the second diaphragm 38 can be adopted. In such a modification, further size reduction can be achieved.

It is essential that a joining portion between the housing of the electroacoustic transducer unit and the second diaphragm has a joining strength enough to prevent separation, and a joining area enough to transfer vibration from the housing to the second diaphragm. The joining area enough to transfer vibration from the housing to the second diaphragm varies depending on rigidity of the second diaphragm. The electroacoustic transducer including the electroacoustic transducer unit includes the cavity and the port leading to the cavity in a state where the housing and the second diaphragm are joined, and the shape of the housing is premised on such a case. However, a portion of the housing overlapping with and joined to the second diaphragm can have various shapes. To give a supplementary description by way of example, the portion of the housing overlapping with and joined to the second diaphragm may be, for example, arc-shaped portions that are intermittently arranged along an outer periphery of the cavity when viewed in a thickness direction of the second diaphragm.

In addition, as a modification of the first to eleventh exemplary embodiments, the first diaphragm and the first suspension (an edge as an example) may be integrally connected.

The first to eleventh exemplary embodiments and the plurality of modifications described above can be combined, if appropriate.

Although an example of the present disclosure has been described above, the present disclosure is not limited thereto, and it is a matter of course that the present disclosure may be variously modified and implemented without departing from the gist of the present disclosure.

The present disclosure of Japanese Patent Application No. 2021-065225, filed on Apr. 7, 2021, is incorporated herein by reference in its entirety.

All documents, patent applications, and technical standards mentioned herein are incorporated herein by reference to the same extent as if each individual document, patent application, and technical standard were specifically and individually stated.

The invention claimed is:

1. An electroacoustic transducer comprising:

a drive unit that generates vibration, the drive unit being configured to, in response to an electric input signal, cause an action portion to generate an action force with respect to a reaction portion and cause the reaction portion to apply a reaction force to the action portion;

a first diaphragm connected to one having a smaller mass out of the action portion and the reaction portion; and a second diaphragm having a larger area than the first diaphragm, the second diaphragm being connected to the first diaphragm via at least a first suspension, and being connected to one having a larger mass out of the action portion and the reaction portion via at least a second suspension, the second diaphragm being configured to radiate a sound to an external space on a front surface side when the drive portion generates vibration, wherein by providing a port that guides a component of at least a partial frequency band of a sound radiated from the first diaphragm in a direction opposite to a direction in which a front surface of the second diaphragm faces, to the external space on the front surface side of the second diaphragm, the electroacoustic transducer is configured such that a sound pressure of a synthesized sound in a vicinity of a crossover frequency of radiated sounds from the first diaphragm and the second diaphragm in when the drive unit generates vibration becomes equal to or higher than a sound pressure of the radiated sound from only one of the first diaphragm and the second diaphragm at the crossover frequency.

2. The electroacoustic transducer according to claim 1, wherein:

a direction of a front surface of the first diaphragm is matched with a direction of the front surface of the second diaphragm, and a sound is radiated from the front surface of the first diaphragm to the external space on the front surface side of the second diaphragm, and the port is configured to guide a component of a partial frequency band of sound radiated from a rear surface of the first diaphragm into a cavity on a rear surface side of the first diaphragm, to the external space on the front surface side of the second diaphragm.

3. The electroacoustic transducer according to claim 2, wherein a communication portion is formed, that allows two spaces in the cavity on the rear surface side of the first diaphragm partitioned by the second suspension to communicate with each other.

4. The electroacoustic transducer according to claim 2, wherein:

a hole is formed to penetrate through the second diaphragm, and the first diaphragm and an outlet of the port are disposed inside the hole when viewed from a front surface side of the second diaphragm, and components including the drive unit, the first diaphragm, the first suspension, the second suspension, and the port are unitized and disposed so as not to protrude from the front surface side of the second diaphragm.

5. The electroacoustic transducer according to claim 1, wherein:

a direction of a front surface of the first diaphragm is opposite to a direction of the front surface of the second diaphragm, and a sound from a rear surface of the first diaphragm is not radiated to the external space on the front surface side of the second diaphragm, and the port is configured to guide a component of at least a partial frequency band of a sound radiated from the front surface of the first diaphragm in the direction opposite to the direction in which the front surface of the second diaphragm faces, to the external space on the front surface side of the second diaphragm.

6. An electroacoustic transducer unit comprising:

a housing that includes an attachment portion;

a drive unit housed in the housing and generates vibration, the drive unit being configured to, in response to an electric input signal, cause an action portion to generate an action force with respect to a reaction portion and cause the reaction portion to apply a reaction force to the action portion;

a first diaphragm provided inside the housing, the first diaphragm connected to one having a smaller mass out of the action portion and the reaction portion;

a first suspension provided inside the housing, the first suspension connects the first diaphragm and the housing; and a second suspension provided inside the housing, the second suspension connects the housing and one having a larger mass out of the action portion and the reaction portion, wherein the electroacoustic transducer unit is used in an electroacoustic transducer in which a second diaphragm is configured to radiate a sound to an external space on a front surface side of the second diaphragm when the drive unit generates vibration in an attached state, in which the attachment portion of the housing is attached to the second diaphragm having a larger area than the first diaphragm, and wherein a port that can guide a component of at least a partial frequency band of a sound radiated from the first diaphragm in a direction opposite to a direction in which a front surface of the second diaphragm faces when the drive unit generates vibration in the attached state, to the external space on the front surface side of the second diaphragm is provided, and by providing the port, the electroacoustic transducer unit is configured such that a sound pressure of a synthesized sound in a vicinity of a crossover frequency of radiated sounds from the first diaphragm and the second diaphragm when the drive unit generates vibration in the attached state becomes equal to or higher than a sound pressure of the radiated sound from only one of the first diaphragm and the second diaphragm at the crossover frequency.

* * * * *